(12) United States Patent
Utoh

(10) Patent No.: US 12,235,906 B2
(45) Date of Patent: Feb. 25, 2025

(54) INFORMATION PROCESSING APPARATUS, DATA MANAGEMENT METHOD, AND NON-TRANSITORY RECORDING MEDIUM

(71) Applicant: Yohsuke Utoh, Kanagawa (JP)

(72) Inventor: Yohsuke Utoh, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/946,052

(22) Filed: Sep. 16, 2022

(65) Prior Publication Data
US 2023/0096705 A1    Mar. 30, 2023

(30) Foreign Application Priority Data

Sep. 28, 2021  (JP) .................. 2021-158290
Mar. 18, 2022  (JP) .................. 2022-044647
Mar. 30, 2022  (JP) .................. 2022-055073

(51) Int. Cl.
*G06F 16/90*   (2019.01)
*G06F 15/02*   (2006.01)
*G06F 16/93*   (2019.01)

(52) U.S. Cl.
CPC .......... *G06F 16/93* (2019.01); *G06F 15/0225* (2013.01)

(58) Field of Classification Search
CPC ............... G06F 16/93; G06F 15/0225
See application file for complete search history.

(56) References Cited

U.S. PATENT DOCUMENTS

| | | | |
|---|---|---|---|
| 8,190,563 B2* | 5/2012 | Tasaka ............ | G06F 16/93 707/610 |
| 2006/0170966 A1* | 8/2006 | Watanabe ......... | G06F 3/1212 358/1.15 |
| 2007/0179984 A1* | 8/2007 | Watanabe ......... | G06F 16/367 |
| 2009/0070348 A1* | 3/2009 | Uejo ............... | G06F 16/93 |
| 2009/0271452 A1* | 10/2009 | Tasaka ............ | G06F 16/93 707/999.203 |

(Continued)

FOREIGN PATENT DOCUMENTS

| | | |
|---|---|---|
| JP | 2008-259211 | 10/2008 |
| JP | 2021-086574 | 6/2021 |

(Continued)

OTHER PUBLICATIONS

U.S. Appl. No. 17/707,982, filed Mar. 30, 2022, Yohsuke Utoh.
Extended European Search Report issued Feb. 9, 2023, in corresponding European Patent Application 22195788.9, 8 pp.

*Primary Examiner* — Daniel A Kuddus
(74) *Attorney, Agent, or Firm* — XSENSUS LLP

(57) ABSTRACT

An information processing apparatus includes circuitry to receive, from a terminal, first electronic data and a request for processing the first electronic data assign, to the first electronic data, first identification information used to control the first electronic data; transmit a request for performing predetermined processing on the first electronic data via a network to an external service system that performs the predetermined processing; and acquire, via the network from the external service system, second identification information used by the external service system to control the first electronic data. The circuitry stores, in a memory, the second identification information in association with the first identification information.

16 Claims, 26 Drawing Sheets

(56) References Cited

U.S. PATENT DOCUMENTS

| | | | | |
|---|---|---|---|---|
| 2010/0007919 | A1* | 1/2010 | Okabe | G06F 16/93 |
| | | | | 358/1.15 |
| 2010/0241630 | A1* | 9/2010 | Williams | G06F 40/237 |
| | | | | 707/769 |
| 2012/0272188 | A1* | 10/2012 | Kunitake | G06F 21/6209 |
| | | | | 715/811 |
| 2013/0191322 | A1* | 7/2013 | Sugano | G06F 21/6218 |
| | | | | 707/602 |
| 2016/0364415 | A1* | 12/2016 | Itoh | G06F 16/5866 |
| 2020/0092436 | A1* | 3/2020 | Lagumbay | H04N 1/00949 |

FOREIGN PATENT DOCUMENTS

| | | | |
|---|---|---|---|
| WO | WO2012120560 | * | 9/2012 |
| WO | WO2012120560 A1 | * | 9/2012 |

* cited by examiner

FIG. 5

| DOCUMENT ID | FILE PATH |
|---|---|
| A | C:\Data\document_A.pdf |
| D | C:\Data\document_D.pdf |
| E | C:\Data\document_E.pdf |
| C | C:\Data\document_A_C.pdf |

FIG. 6

| DOCUMENT ID | FILE NAME | DOCUMENT TYPE | CONTRACT START DATE | CONTRACT END DATE | ASSOCIATION INFORMATION | ⋮ |
|---|---|---|---|---|---|---|
| A | document_A.pdf | BASIC CONTRACT | 2021/08/01 | 2022/07/31 | 111 | ⋮ |
| D | document_D.pdf | BUSINESS CONTRACT | 2021/09/01 | 2022/08/31 | | ⋮ |
| E | document_E.pdf | MEMORANDUM | 2021/10/10 | 2023/10/31 | | ⋮ |
| C | document_A_C.pdf | BASIC CONTRACT (CONCLUDED) | | | 111 | ⋮ |
| ⋮ | ⋮ | ⋮ | ⋮ | ⋮ | ⋮ | ⋮ |

FIG. 7

| WORKFLOW ID | START TRIGGER | FLOW 1 | FLOW 2 |
|---|---|---|---|
| 1 | CHANGE IN METADATA | EXAMINATION BY MR. A | APPROVAL BY MR. B |
| 2 | STORING OF DOCUMENT | TRANSMISSION OF FILE TO ELECTRONIC CONTRACT SYSTEM | PERIODICAL ACQUISITION OF CONCLUDED FILE |

FIG. 8

| WORKFLOW ID | DOCUMENT ID BEFORE PROCESSING | DOCUMENT ID IN ELECTRONIC CONTRACT SYSTEM | DOCUMENT ID AFTER PROCESSING |
|---|---|---|---|
| 1 | A | - | - |
| 2 | ... | ... | ... |

FIG. 10

| WORKFLOW ID | DOCUMENT ID BEFORE PROCESSING | DOCUMENT ID IN ELECTRONIC CONTRACT SYSTEM | DOCUMENT ID AFTER PROCESSING |
|---|---|---|---|
| 1 | A | B | – |
| 2 | ... | ... | ... |

FIG. 11

| WORKFLOW ID | DOCUMENT ID BEFORE PROCESSING | DOCUMENT ID IN ELECTRONIC CONTRACT SYSTEM | DOCUMENT ID AFTER PROCESSING |
|---|---|---|---|
| 1 | A | B | C |
| 2 | ... | ... | ... |

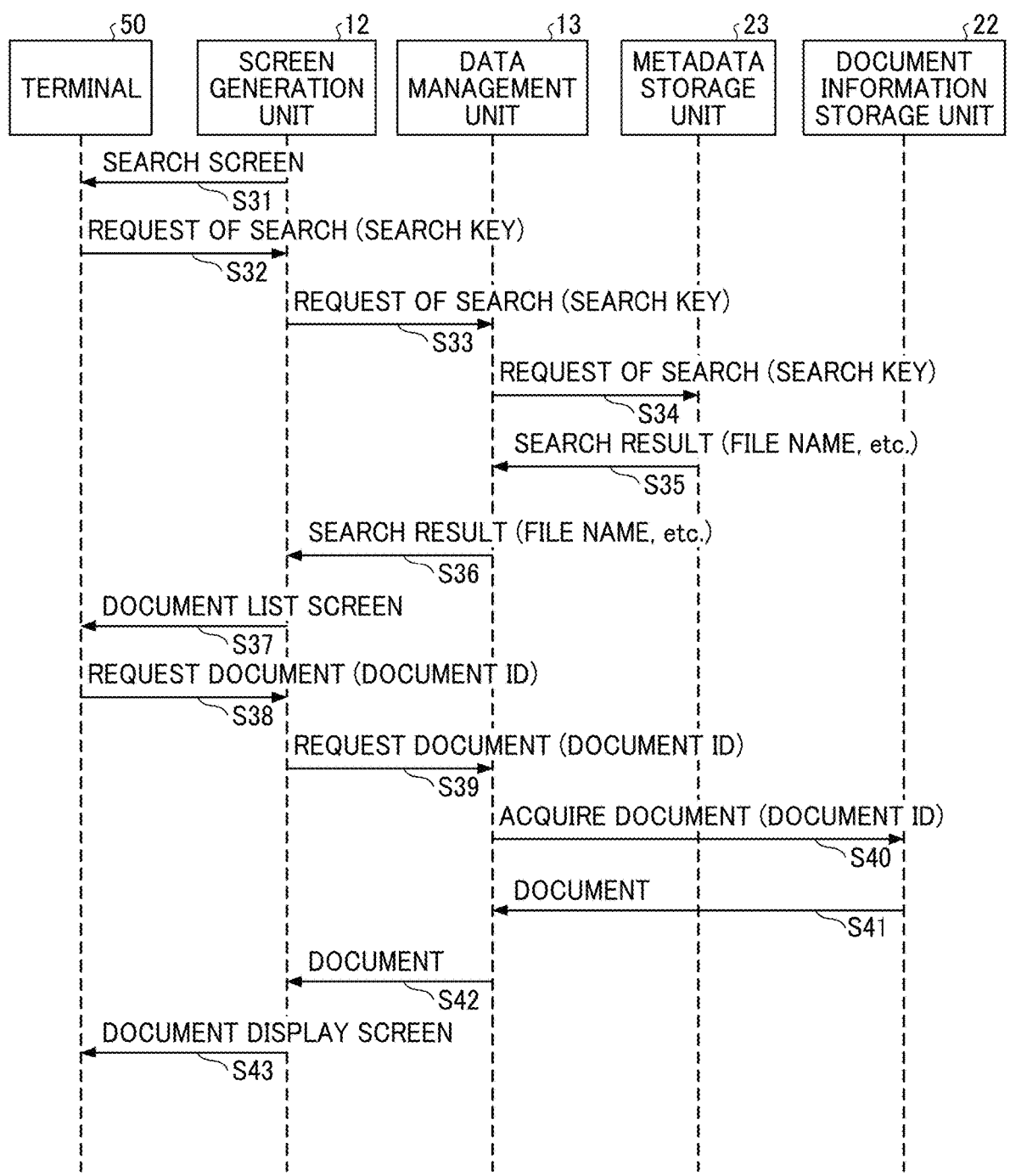

FIG. 22

| DOCUMENT ID BEFORE PROCESSING | DOCUMENT ID IN EXTERNAL SERVICE SYSTEM |
|---|---|
| A | B |

FIG. 23

| DOCUMENT ID | FILE NAME | DATE OF PROCESSING |
|---|---|---|
| B | DOCUMENT_A_B.pdf | 20xx/02/14 |
| F | DOCUMENT_D_F.pdf | 20xx/02/15 |
| G | DOCUMENT_E_G.pdf | 20xx/02/16 |

FIG. 29

| DOCUMENT ID | FILE PATH |
|---|---|
| A | C:\Data\document_A.pdf |
| D | C:\Data\document_D.pdf |
| E | C:\Data\document_E.pdf |
| B | C:\Data\document_A_B.pdf |

FIG. 30

| DOCUMENT ID | FILE NAME | DOCUMENT TYPE | CONTRACT START DATE | CONTRACT END DATE | ... |
|---|---|---|---|---|---|
| A | document_A.pdf | BASIC CONTRACT | 2021/08/01 | 2022/07/31 | ... |
| D | document_D.pdf | BUSINESS CONTRACT | 2021/09/01 | 2022/08/31 | ... |
| E | document_E.pdf | MEMORANDUM | 2021/10/10 | 2023/10/31 | ... |
| B | document_A_B.pdf | BASIC CONTRACT (CONCLUDED) | | | ... |
| ... | ... | ... | ... | ... | ... |

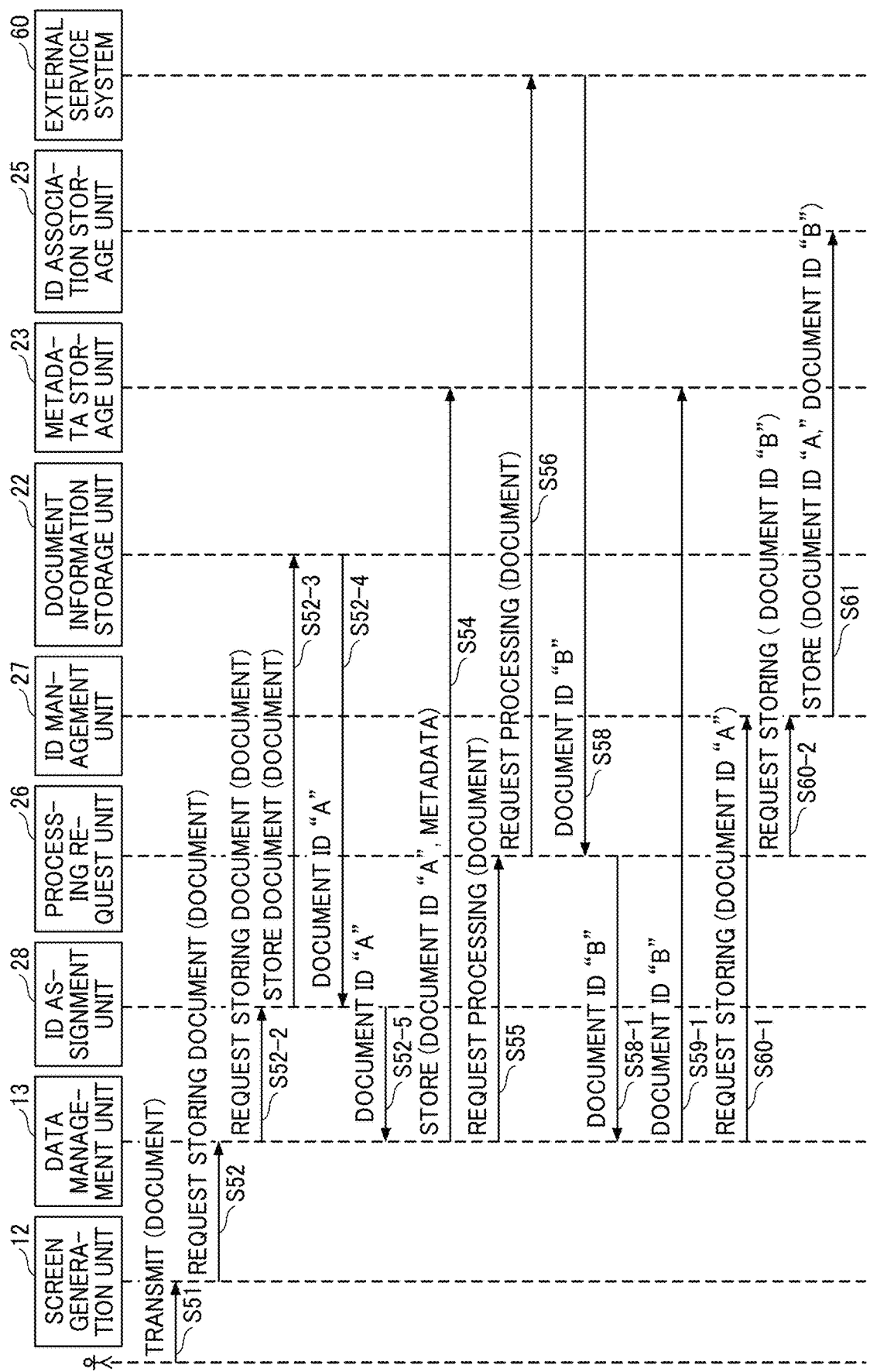

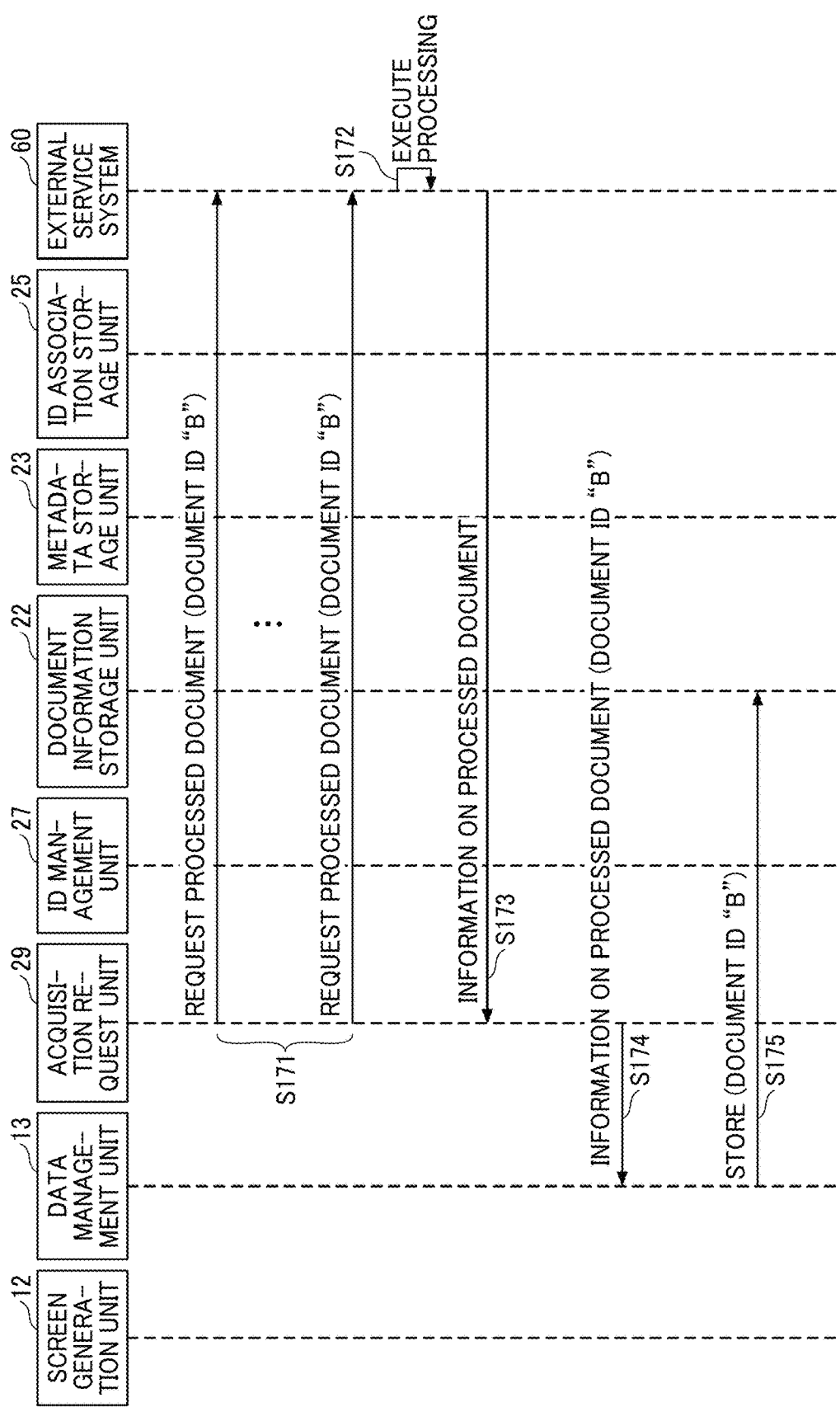

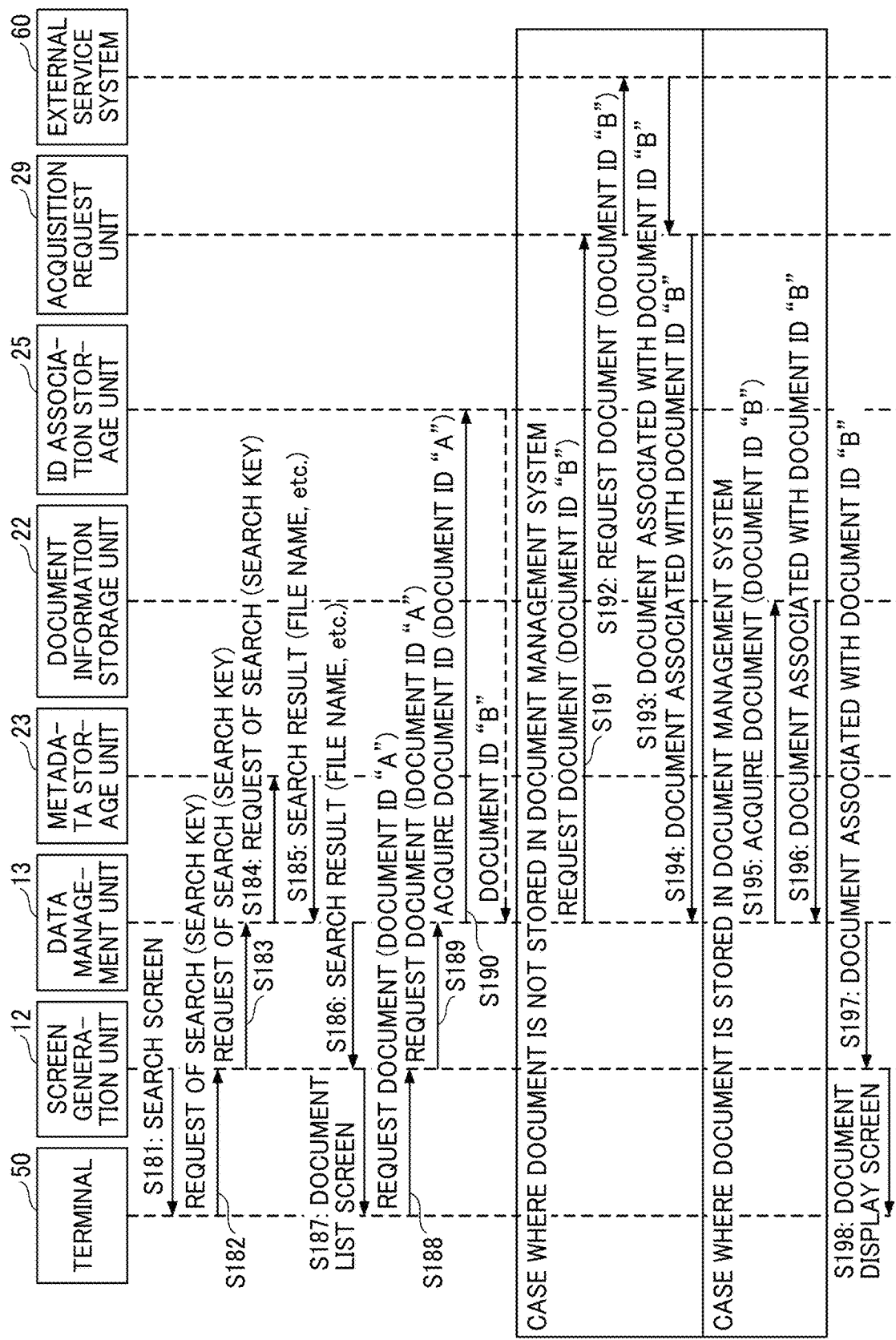

INFORMATION PROCESSING APPARATUS, DATA MANAGEMENT METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2021-158290, filed on Sep. 28, 2021, 2022-044647, filed on Mar. 18, 2022, and 2022-055073, filed on Mar. 30, 2022, in the Japan Patent Office, the entire disclosure of which is hereby incorporated by reference herein.

BACKGROUND

Technical Field

The present disclosure relates to an information processing apparatus, a data management method, and a non-transitory recording medium.

Related Art

There is a method of assigning identification information to electronic data and controlling the electronic data. Further, there is a processing method in which an information processing apparatus that controls electronic data transmits the electronic data to an external service system and requests the external service system to process the data.

Further, there is a technology for registering an electronic document in a server with reference to identification information.

SUMMARY

In one aspect, an information processing apparatus includes circuitry to receive, from a terminal, first electronic data and a request for processing the first electronic data; assign, to the first electronic data, first identification information used to control the first electronic data; transmit a request for performing predetermined processing on the first electronic data via a. network to an external service system that performs the predetermined processing; and acquire, via the network from the external service system, second identification information used by the external service system to control the first electronic data. The circuitry stores, in a memory, the second identification information in association with the first identification information.

In another aspect, a data management method performed by an information processing apparatus includes receiving, from a terminal, first electronic data and a request for processing the first electronic data; assigning, to the first electronic data, first identification information used to control the first electronic data; transmitting a request for performing predetermined processing on the first electronic data via a network to an external service system that performs the predetermined processing; acquiring, via the network from the external service system, second identification information used by the external service system to control the first electronic data; and storing, in a memory, the second identification information in association with the first identification information.

In another aspect, a non-transitory recording medium stores a plurality of program codes which, when executed by one or more processors, causes the processors to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an example of document information stored in a document information storage unit according to embodiments;

FIG. 6 illustrates an example of metadata stored in a metadata storage unit according to embodiments;

FIG. 7 illustrates an example of workflow information stored in a workflow information storage unit according to embodiments;

FIG. 8 is a diagram illustrating an example of identifier (ID) association information stored in an ID association storage unit according to embodiments;

FIG. 10 is a diagram illustrating an example of the ID association information generated in workflow processing according to embodiments;

FIG. 11 is a diagram illustrating an example of the ID association information generated after the workflow processing according to embodiments;

FIG. 13 is a sequence diagram illustrating an example of a procedure for searching for a document in response to a user operation, according to Embodiment 1;

FIG. 22 is a diagram schematically illustrating ID association information stored in an ID association storage unit according to Embodiment 2;

FIG. 23 is a diagram schematically illustrating processed document information stored in a processed document information storage unit according to Embodiment 2;

FIG. 29 is a diagram illustrating an example of document information stored in a document information storage unit according to Embodiment 3;

FIG. 30 illustrates an example of metadata stored in a metadata storage unit according to Embodiment 3;

FIG. 31 is a sequence diagram illustrating an example of a procedure for the document management system according to Embodiment 3 to store the document ID used by the document management system and the document ID used by the external service system in association with each other;

FIG. 32 is a sequence diagram illustrating an example of a procedure for the document management system according to Embodiment 3 to acquire information on the processed document from the external service system; and FIG. 33 is an example of a sequence diagram illustrating a procedure for the document management system according to Embodiment 3 to provide the terminal with a search result of a document requested by a user.

Figure 1:
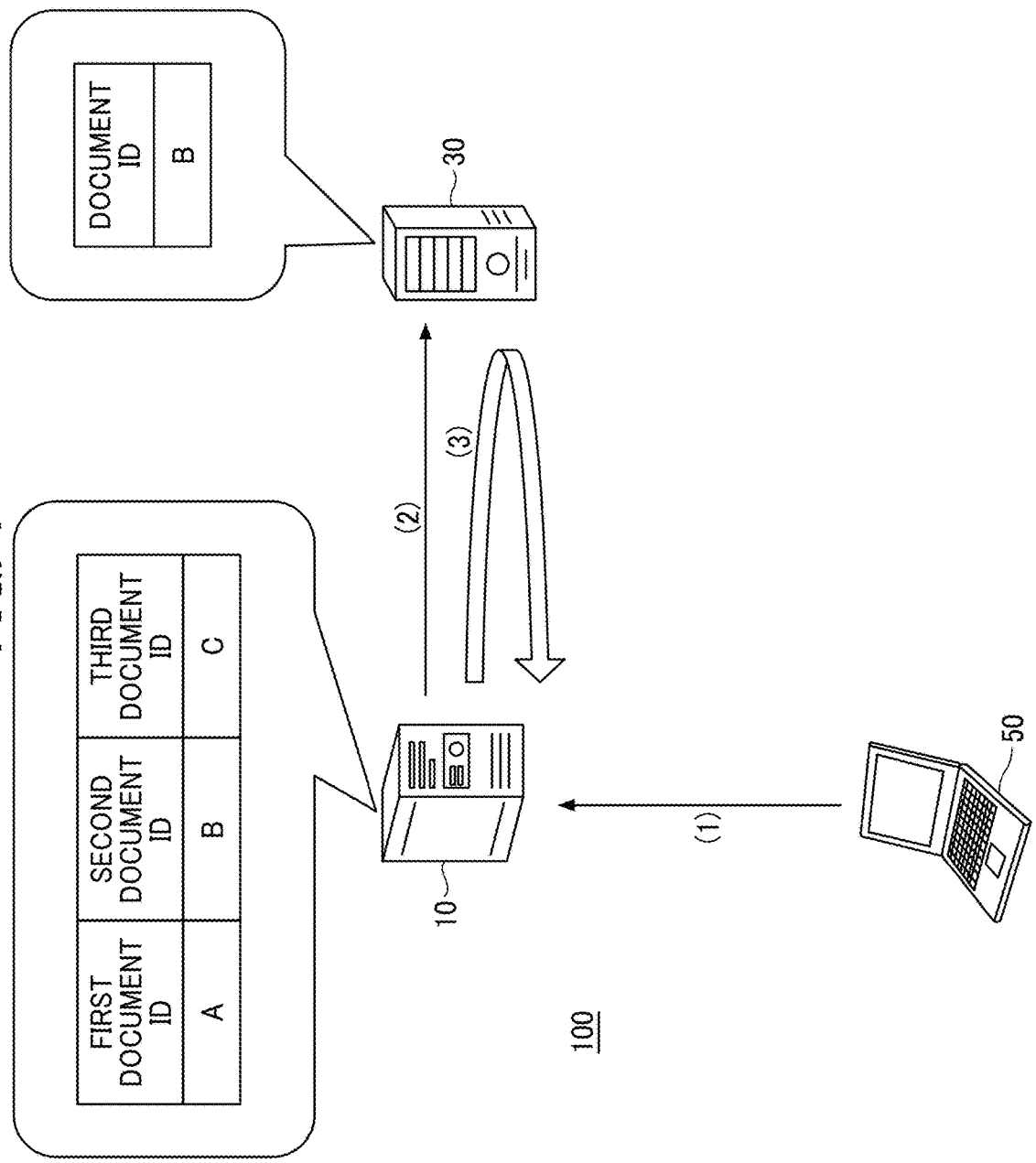
FIG. 1 is a diagram illustrating an outline of a method of controlling electronic data performed by a document management system according to Embodiment 1.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION in describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions are given of a document management system and a data management method performed by the document management system as example embodiments of the present disclosure.

Embodiment 1

Outline of Operation

FIG. 1 is a diagram illustrating an outline of an electronic data management method performed by a document management system 10. The document management system 10 stores and processes a variety of documents. In some cases, the document management system TO executes workflow including a series of processing on a document and requests an electronic contract system 30 to perform a part of the workflow. The electronic contract system 30 performs communication regarding contracts with another party (a business partner or a customer) of a contract and gives an electronic signature.

In such a system configuration, the document management system 10 of the present embodiment stores a document before processed by the electronic contract system 30 and a document after processed by the electronic contract system 30 in association with each other.

(1) A user operates a terminal 50 (communication terminal) to create a document, which is, for example, a contract, and uploads the document to the document management system 10. The document management system 10 controls the document (contract) by assigning the document with a document identification information (ID) "A," which is an example of first identification information. The document ID assigned to the document before processing is also referred to as "first document ID."

(2) When a predetermined condition for starting a workflow is satisfied, the document management system 10 executes the workflow. In the workflow, the document management system 10 transmits the document to the electronic contract system 30 and acquires a document ID "B" given to the document by the electronic contract system 30 as a return value. The document ID given by the electronic contract system 30 is an example of second identification information. The document ID acquired in response to transmitting the document is also referred to as "second document ID."

(3) In the workflow, the document management system 10 acquires the concluded document identified by the document ID "B" from the electronic contract system 30 at a predetermined timing. The document management system 10 controls the concluded document by assigning a document ID "C" (an example of third identification information) to the concluded document. The document ID assigned to the concluded document is also referred to as "third document ID," Accordingly, the document management system 10 can associate the document before processing with the document after processing using the document IDs "A" to "C."With the above processing, the information processing system 100 stores the three document IDs "A" to "C" in association with each other. Therefore, when the user searches for a document and determines the document ID "A" of the document, the document management system 10 can also determine the concluded document identified by the document ID "C." The document management system 10 can also request the concluded document identified by the document ID "B" from the electronic contract system 30.

In other words, in the document management system 10 serving as the information processing apparatus, the electronic data before processing is associated with the electronic data after processing, which obviates the need for a user to use different systems for controlling electronic data before processing and electronic data after processing.

Terms

"Electronic data" is data that is processed by a computer. In the present embodiment, the electronic data includes a "document" as an example. A document does not necessarily include characters. The electronic data may be image data such as a moving image or a still image.

The term "processing" or "process" represents information processing and refers to calculation, classification, collation, and other processing performed by a computer on information represented by numbers, characters, physical quantities, and the like.

The term "workflow" refers to performing a predetermined series of processing on data by a system or a series of processing.

The term "associating" refers to associating a plurality of items with each other or mutually linking a plurality of items.

The term "identification information" refers to information used to identify or specify a specific one of various objects. "Identification information" is also referred to as an identifier or an identification (ID). "Identification information" may be a combination of a name, a code, a character string, or a numerical value.

The associating means setting some relation between a certain object and another object. For example, two identification information may be registered in the same row or column in a table, or identical information may be associated with each of the two identification information.

System Configuration

Figure 2:
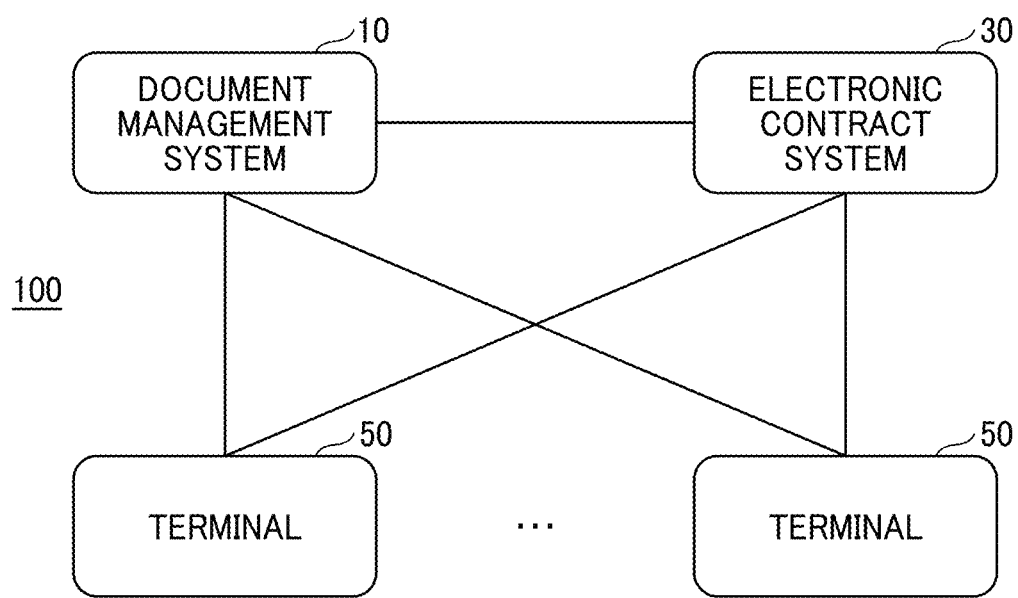
FIG. 2 is a schematic block diagram illustrating a configuration of an information processing system according to Embodiment 1.

A configuration of an information processing system 100 is described with reference to FIG. 2. FIG. 2 is a schematic block illustrating an example of the configuration of the information processing system 100.

The information processing system 100 includes at least the document management system 10.

The information processing system 100 may further include the electronic contract system 30. The document management system 10 and the electronic contract system 30 are connected via a network to communicate with each other. It is not essential that the document management system 10 and the electronic contract system 30 are constantly connected to each other. Further, the document management system 10 receives connection from the terminal 50. It is not essential that the document management system 10 and the terminal 50 are constantly connected to each other. Further, the electronic contract system 30 receives connection from the terminal 50 it is not essential that the electronic contract system 30 and the terminal 50 are constantly connected to each other.

The document management system 10 includes one or more information processing apparatuses. The document management system 10 provides a service for controlling documents. The document management system 10 adds metadata to a document to enable efficient retrieval of the document using the metadata. In addition, the document management system 10 has a workflow function to provide a service of processing a document before or after starting management of the document. The metadata is data about certain data and is additional data about the certain data, accompanying the certain data. Details are to be described later.

In the workflow function, processing may be performed by the electronic contract system 30. Conventionally, the document management system 10 does not store the document ID of a document processed by other systems. In the present embodiment, as described above with reference to FIG. 1, the document management system 10 stores the first document ID used in the document management system 10 and the second document ID used in the electronic contract system 30 in association with each other.

The document management system 10 may be implemented by cloud computing or may be implemented by a single information processing apparatus. The term "cloud computing" refers to the availability of resources on a network without identifying specific hardware resources. The document management system 10 may reside on the Internet or may be on-premises.

The electronic contract system 30 includes one or more information processing apparatuses. The electronic contract system 30 performs a process related to an electronic contract. Although there is no fixed definition thereof, the electronic contract system 30 is a system that concludes a contract by affixing an electronic signature or a time stamp to electronic data on the Internet instead of adding a seal to a paper contract. The electronic data is, for example, a contract in portable document format (PDF) format). In addition to concluding a contract, the electronic contract system 30 stores the concluded contract document, retrieves the contract, and performs cooperation with other systems. The electronic contract system 30 may have a workflow function to perform approval or request for approval.

As an example, an electronic signature is created as follows. Mr. A who wants to sign a document creates a hash value of the document using a hash function and encrypts the hash value using a private key. Mr. A affixes an electronic signature to the document and stores the document. Mr. B wants to know whether the document has been falsified and decrypts the electronic signature using the public key of Mr. A, obtains the hash value of the document, and compares the documents. When the two documents match, it is verified that the document has been created by the owner of the private key corresponding to the public key and has not been falsified by anyone other than the owner of the private key. Further, Mr. B checks whether the public key is valid by certificate verification. The certificate verification is inquiring of a certificate authority whether a signature of the certificate authority included in the public key is valid.

The electronic contract system 30 is used by the document management system 10 in the workflow. The electronic contract system 30 may be one of the following.

Time stamp system: A time stamp is time certification information for certifying, in a third party manner, the existence of electronic data at a specific point of time and maintains evidentiality without being falsified thereafter. The electronic certificate ensures that the document has not been falsified and also ensures the existence of electronic data at a specific point of time.

Noise removal system: A noise removal system is a system that removes noise from documents. Noise refers to unnecessary information other than necessary information such as a signature.

Watermarking system: A watermarking system is a system that gives documents a digital watermark. Digital watermarking refers to a technology for embedding related information in data such as an image, a moving image, and a sound in a form unperceivable by humans. Embedded information can be detected by using dedicated software or the like.

The electronic contract system 30 may be implemented by cloud computing or may be implemented by a single information processing apparatus. The electronic contract system 30 may reside on the Internet or may be on-premises.

The terminal 50 is a general-purpose computer that communicates with the document management system 10 and the electronic contract system 30. In the terminal 50, a web browser operates to display various screen images based on screen information received from the document management system 10 or the electronic contract system 30. The user requests the document management system 10 to, for example, register a document, execute a workflow, and retrieve a document. In addition, the user can request the electronic contract system 30 to, for example, search and browse a document to which an electronic signature is attached.

The terminal 50 is, for example, a personal computer (PC), a smartphone, a tablet terminal, or a personal digital assistant (PDA) and may be any device on which a web browser operates. In the terminal 50, not only a web browser but also an application dedicated to the document management system 10 or the electronic contract system 30 may operate.

Further, the terminal 50 may be an electronic device such as a multifunction peripheral/product/printer (MFP) or an electronic whiteboard. For example, by transmitting image data (document) scanned by an MFP to the document management system 10, the MFP substitutes for the terminal 50. In addition, the terminal 50 may be a video conference terminal, a digital signage, or a projector. In the case of an electronic whiteboard, the terminal 50 transmits hand drafted data to the document management system 10. In the case of a video conference terminal, the terminal 50 transmits audio data to the document management system 10.

Figure 3:
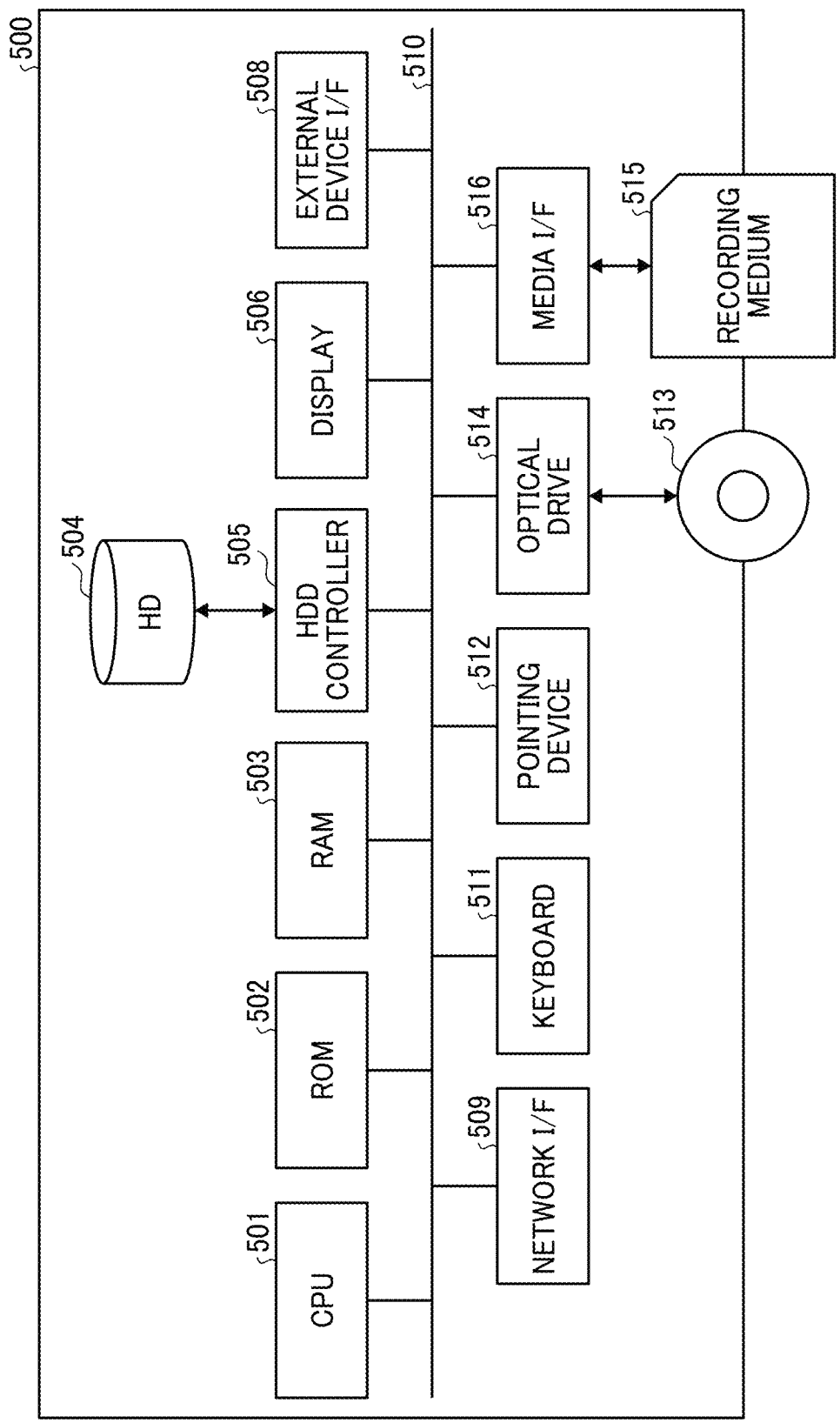
FIG. 3 is a block diagram illustrating an example of a hardware configuration of a computer.

Hardware Configuration
Document Management System, Electronic Contract System, and Terminal Each of the document management system 10, the electronic contract system 30, and the terminal 50 is implemented by, for example, a computer 500 having a hardware configuration illustrated in FIG. 3. FIG. 3 is a block diagram illustrating an example of the hardware configuration of the computer 500. As illustrated in FIG. 3, the computer 500 includes a central processing unit (CPU) 501, a read only memory (ROM) 502, a random access memory (RAM) 503, a hard disk (HD) 504, a hard disk drive (HDD) controller 505, a display 506, an external device interface (I/F) 508, a network I/F 509, a bus line 510, a keyboard 511, a pointing device 512, an optical drive 514, and a media I/F 516.

The CPU 501 controls entire operation of the computer 500. The ROM 502 stores programs, such as an initial program loader (IPL), for driving the CPU 501. The RAM 503 is used as a work area for the CPU 501. The HD 504 is a storage area that stores various data such as programs. The HDD controller 505 controls reading and writing of various data from and to the HD 504 under control of the CPU 501. The display 506 displays various information such as a cursor, a menu, a window, characters, and images. The external device I/F 508 is an interface for connecting to various external devices. Examples of the external devices in this case include a universal serial bus (USB) memory and an image forming apparatus. The network I/F 509 is an interface for performing data communication using a communication network. The bus line 510 is, for example, an address bus or a data bus for electrically connecting the components such as the CPU 501 illustrated in FIG. 3 with each other.

The keyboard 511 is a kind of input device including a plurality of keys for inputting a character, a numerical value, various instructions, and the like. The pointing device 512 is an example of an input device that allows a user to select or execute various instructions, select an item for processing, or move a cursor being displayed. The optical drive 514 controls reading or writing of various data with from or to an optical recording medium 513, which is an example of a removable recording medium. Examples of the optical recording medium include, but not limited to a compact disc (CD), a digital versatile disc (DVD), and BLU-RAY (registered trademark). The media I/F 516 controls reading and writing (storing) of data from and to a recording medium 515 such as a flash memory.

Functions

Figure 4:
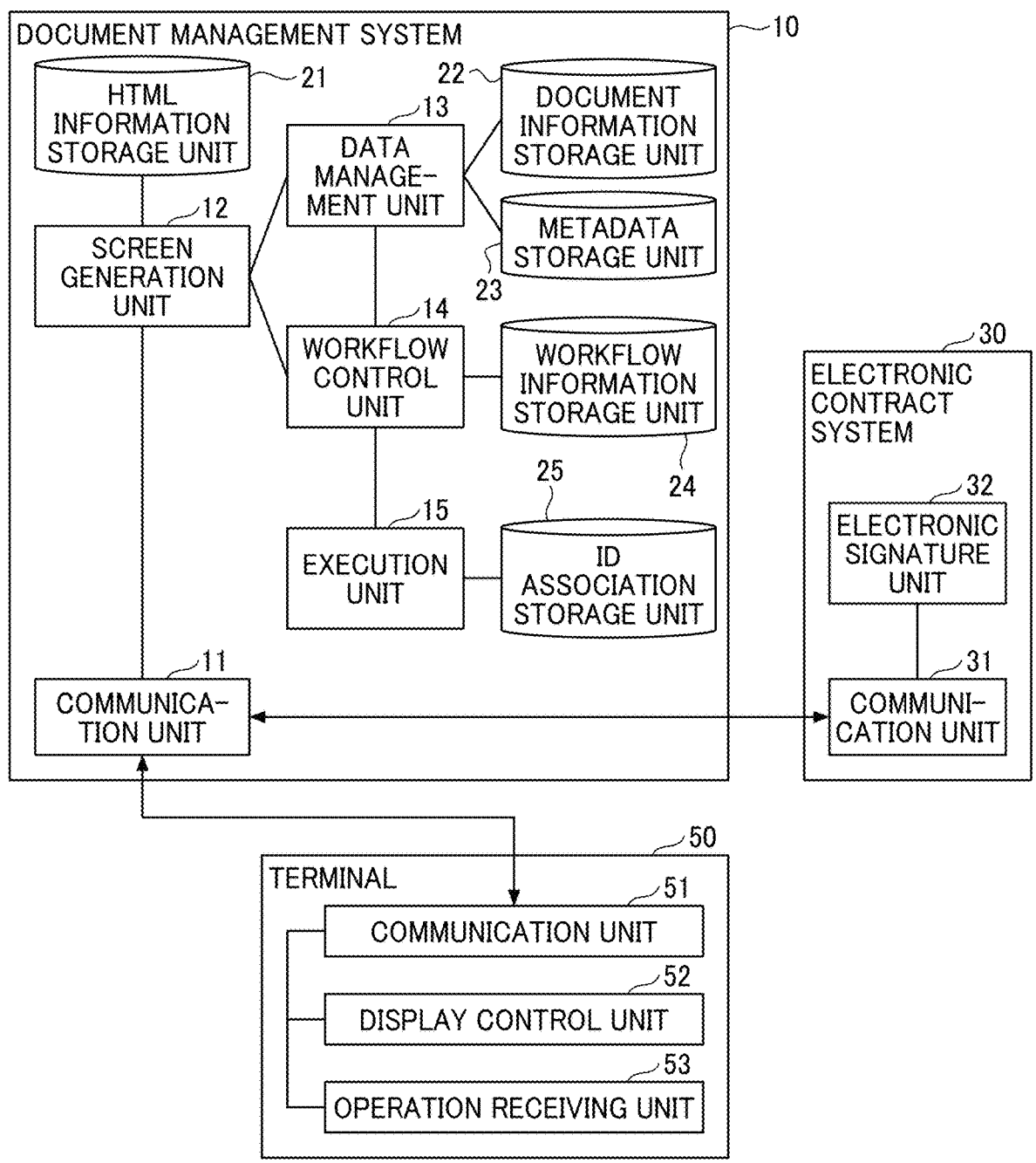
FIG. 4 is a block diagram illustrating functional configurations of the document management system, an electronic contract system, and a terminal according to Embodiment 1.

Next, functions of the document management system 10, the electronic contract system 30, and the terminal 50 will be described with reference to FIG. 4. FIG. 4 is a block diagram illustrating an example of functional configurations of the document management system 10, the electronic contract system 30, and the terminal 50.

Document Management System

The document management system 10 includes a communication unit 11, a screen generation unit 12, a data management unit 13, a workflow control unit 14, an execution unit 15, a hypertext markup language (HTML) information storage unit 21, a document information storage unit 22, a metadata storage unit 23, a workflow information storage unit 24, and an ID association storage unit 25. These functions of the document management system 10 are implemented by the CPU 501 of the computer 500 illustrated in FIG. 3 executing a program developed from the HD 504 to the RAM 503. The HTML information storage unit 21, the document information storage unit 22, the metadata storage unit 23, the workflow information storage unit 24, and the ID association storage unit 25 are storage areas built in the HD 504, the RAM 503, or the like of the computer 500 illustrated in FIG. 3. The HTML information storage unit 21, the document information storage unit 22, the metadata storage unit 23, the workflow information storage unit 24, and the ID association storage unit 25 are not necessarily included in the document management system 10 and may reside at any location on a network.

The communication unit 11 transmits and receives various kinds of information to and from the terminal 50 or the electronic contract system 30. In the present embodiment, the communication unit 11 receives a document from the terminal 50 and transmits screen information of various screens to the terminal 50. The communication unit 11 transmits a document to the electronic contract system 30 and receives the document processed by the electronic contract system 30 and the document ID thereof.

The screen generation unit 12 refers to the HTML information storage unit 21 and generates screen information for various screens (or windows) to be displayed by the terminal 50. The HTML information storage unit 21 stores templates of screens. In the templates, various tags, script language formats, and respective formats of the tags are set in advance. Tags define the arrangement of titles, characters, tables, labels, buttons, and the like to be displayed on the web page. The format defines color, size, character font, or the like of HTML documents by cascading style sheets (CSS). The format of the script language defines the content of the processing. The screen generation unit 12 generates, using the template, screen information for displaying a search screen, a document list screen, and the like, which will be described later. The screen information (screen display data) is a program described in hypertext markup language (HTML), Extensible Markup Language (XML), a script language, and cascading style sheets (CSS). The structure of web page is mainly specified by HTML, the operation of the web page is specified by the script language, and the style of the web page is specified by CSS. Note that a mechanism for dynamically generating a web page in this manner so as to realize interactive processing between a server and a client is referred to as a web application. The term "web application" refers to software (or a mechanism for such software) that is implemented by cooperation between a program defined by a programming language (for example, JAVASCRIPT) to function on a web browser and a program on a web server.

The data management unit 13 stores a document transmitted from the terminal 50 in association with metadata. The data management unit 13 stores the body (a file) of the document in the document information storage unit 22 and stores the metadata in the metadata storage unit 23.

The workflow control unit 14 receives registration of a workflow, refers to the workflow information storage unit 24, monitors a start trigger, and controls generation of the execution unit 15.

The workflow information will be described later.

The execution unit 15 is a module that executes a workflow. The execution unit 15 may be referred to as a workflow itself. The execution unit 15 is an instance dynamically generated by the workflow control unit 14. The execution unit 15 automatically executes a process corresponding to the process content of the workflow. The execution unit 15 operates independently as an individual module for each document. The processing by the execution unit 15 includes assignment of a task and communication with an external system.

FIG. 5 illustrates an example of document information stored in the document information storage unit 22. The document information represents a document itself or a storage location of the document.

The document ID is identification information for uniquely identifying a document. The document ID may be a file name (if not used for another file), a file path, or a uniform resource locator (URL). The user can access the document using the document ID. The document ID is either a document ID (first document ID) assigned by the data management unit 13 before the document is processed by the electronic contract system 30 or a document ID (third document ID) assigned by the data management unit 13 after the document is processed by the electronic contract system 30.

The file path represents the document itself or the storage location of the document FIG. 6 illustrates an example of metadata stored in the metadata storage unit 23. Metadata is data attached to a document and is useful data for controlling the document. A description is given below of each item of the metadata. The metadata may be referred to as data of data.

A "document ID" is the same as the document ID in the document information storage unit 22 and is identification information for uniquely identifying a document.

A "file Name" is the name of a document.

A "document type" indicates what kind of processing the document is used for. When the electronic contract system 30 processes documents, many of the document types are contract-related as presented in FIG. 6, but this is merely an example. Information indicating "having been processed by the electronic contract system 30" may be attached to the document having been processed by the electronic contract system 30.

A "contract start date" is the date from which the contract period starts when the document relates to a contract. A "contract end date" is the date on which the contract period ends. The system allows the user to change the contract start date and contract end date.

The association information is identification information that indicates association between a document registered in the document management system 10 and a document processed by the electronic contract system 30. In the example illustrated in FIG. 6, the document having the document ID "A" and the document having the document ID "C" are associated with a common association information "111". When a document registered in the document management system 10 is processed by the electronic contract system 30, the association information enables the document management system 10 to easily identify which of documents registered in the document management system 10 corresponds to the processed document.

The system allows the user to edit a file name, a document type, a contract start date, a contract end date, and the like on the Web page at the time of registration of the document. In other words, the user can register the metadata. Furthermore, the system allows the user to set which attribute is to be registered in the metadata storage unit 23. In other words, the user can register an item of metadata. Thus, the user can register the attribute of the document to be used for search as metadata. Therefore, the data items in the metadata storage unit 23 are not limited to those illustrated in the drawing.

In FIG. 6, the document registered in the document management system 10 is associated with the document processed by the electronic contract system 30 by the association information. Alternatively, the document registered in the document management system 10 may be directly associated with the document processed by the electronic contract system 30 in a table.

FIG. 7 illustrates an example of workflow information stored in the workflow information storage unit 24. The workflow information defines the content of a series of processing to be performed by the workflow. A description is given below of each item of the workflow information.

A "workflow ID" is identification information of a workflow. If there is uniqueness, the name of the workflow may be used as the identification information.

A "start trigger" is a condition under which the workflow control unit 14 generates the execution unit 15 (in other words, the execution unit 15 starts the workflow). When an event that matches the content of the start trigger occurs, the execution unit 15 automatically starts execution of the workflow. Therefore, the user does not need to explicitly specify a workflow to start execution. The start triggers in the drawing are merely examples, and there may be a workflow in which the start trigger is a regularly executed workflow and a workflow in which the start trigger is registration of a file name, for example.

"Flow 1" and "Flow 2" indicate a series of processing performed by the execution unit 15 in the workflow in that order. Flow 1 is the first process, and flow 2 is the second process. Although the number of processing is two in FIG. 7, the number of processing may be any number and may be different depending on the workflow.

For example, in the workflow of ID "1," a change in the metadata triggers an examination process by Mr. A and an approval process by Mr. B. In the workflow of ID "2," storing of a new document triggers transmission of the document to the electronic contract system 30 and periodical acquisition of a concluded file (processed file) from the electronic contract system 30.

FIG. 8 illustrates an example of the ID association information stored in the ID association storage unit 25. The ID association information is information associating the first document ID, which is assigned by the document management system 10 before the execution unit 15 executes a workflow (document ID before processing by the electronic contract system 30), with the second document ID, which is assigned by the electronic contract system 30. Alternatively, the first document ID (assigned to a document before processing by the electronic contract system 30) may be assigned by the document management system 10 by execution of a workflow by the execution unit 15. The ID association information in FIG. 8 is temporarily generated for selling the association information of the metadata. The ID association information in FIG. 8 is automatically discarded (the memory is released) when the workflow ends. A description is given below of each item of the workflow information.

The "workflow ID" is the same as that in the workflow information storage unit 24. The workflow ID and the document are associated with each other by the ID association information.

The document ID before processing is a document ID (first document ID) in the document management system 10, assigned, for example, before the workflow is started. The document ID before processing is assigned by the document management system 10.

The document ID in the electronic contract system 30 is a document ID (second document ID) used in the electronic contract system 30 and transmitted in response from the electronic contract system 30 when the document is registered in the electronic contract system 30 by the workflow. The document ID in the electronic contract system 30 is assigned by the electronic contract system 30.

The document ID after processing is a document ID (third document ID) assigned by the document management system 10 to the document processed by the electronic contract system 30 and acquired by the document management system 10. The document ID after processing is assigned by the document management system 10.

In this way, three different document IDs are assigned to the same document and associated with each other by the ID association information. Since FIG. 8 illustrates the ID association information in a state immediately after the document is registered in the document management system 10, only the document ID "A" before processing is set.

Electronic Contract System

Description with reference to FIG. 4 is continued. The electronic contract system 30 includes a communication unit 31 and an electronic signature unit 32. These functions of the electronic contract system 30 are implemented by the CPU 501 of the computer 500 illustrated in FIG. 3 executing a program stored in the RD 504.

The communication unit 31 communicates with the document management system 10 (specifically, the communication unit 11) and other functional units of the electronic contract system 30, to transmit or receive various information. In the present embodiment, the communication unit 31 receives a document from the document management system 10 and transmits the document processed by the electronic contract system 30 and the document ID thereof to the document management system 10.

The electronic signature unit 32 performs a series of processing related to a contract and adds an electronic signature certifying that the contract has been completed to the document, for example. Adding electronic signature is merely an example of the predetermined processing. For example, as the predetermined processing, the electronic contract system 30 affixes a time stamp, removes noise from a document, and creates a digital watermark.

Terminal

The terminal 50 includes a communication unit 51, a display control unit 52, and an operation receiving unit 53.

These functional units provide functions or means implemented by the CPU 501 (see FIG. 3) executing instructions included in one or more programs installed on the terminal 50. Such program (or programs) may be a web browser or a dedicated application.

The communication unit 51 transmits and receives various kinds of information to and from the document management system 10.

In the present embodiment, the communication unit 51 receives various kinds of screen information and the like from the document management system 10 and transmits a document and contents of user input to the document management system 10.

The display control unit 52 interprets the screen information of various screens to display the contents on the display 506.

The operation receiving unit 53 receives various operations made by the user on various screens displayed on the display 506.

Procedure of Registration

Figure 9:
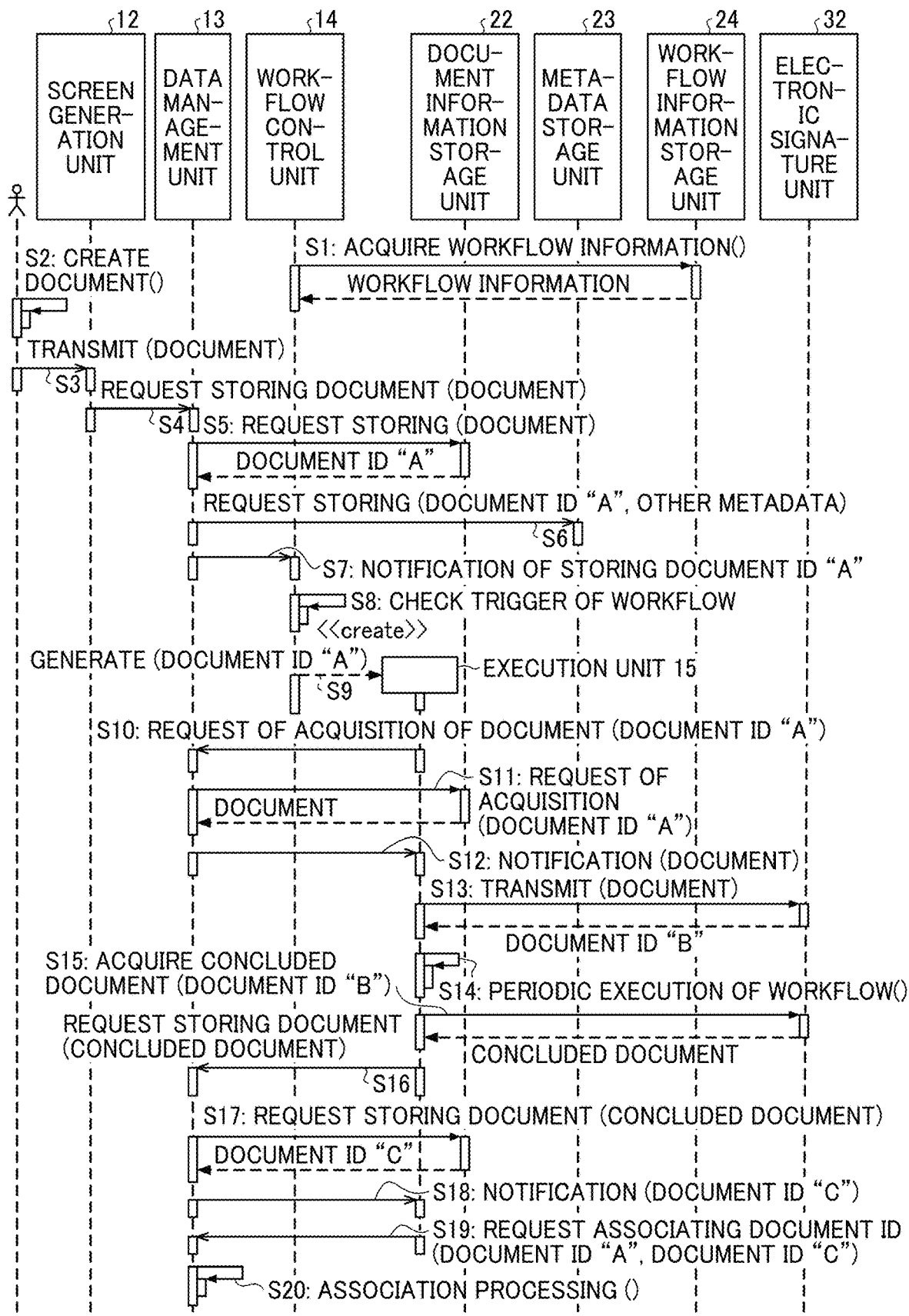
FIG. 9 is a sequence diagram illustrating an example of a procedure in which the document management system assigns identification information to a document and controls the document, according to Embodiment 1.

Next, with reference to FIG. 9, a description is given of a procedure in which the document management system 10 assigns the first, second, and third document IDs to a document. FIG. 9 is a sequence diagram illustrating the procedure for the document management system 10 to control a document using the three document IDs assigned to the document.

S1: When the document management system 10 is activated or when the workflow information in the workflow information storage unit 24 is updated the workflow control unit 14 acquires the workflow information from the workflow information storage unit 24. This process may be performed by an operation of the administrator.

S2: The user operates the terminal 50 to create a contract, which is an example of a document. The format of the document file is not limited and may be a general-purpose format such as PDF or MICROSOFT WORD, or a desired application format. The document management system 10 may support the creation of the document. In this case, the terminal 50 executes a web application provided by the document management system 10 and inputs or selects characters or the like in accordance with guidance of the web application, thereby creating a desired document.

S3: The terminal 50 displays a web page for document registration generated by the screen generation unit 12. The user uploads (transmits) the document (contract) to the information processing system 100 from the web page. The user inputs, to the terminal 50, an operation of transmitting the document (contract) to the document management system 10. The user sets a desired metadata item and inputs a value. The operation receiving unit 53 of the terminal 50 receives the operation. The communication unit 51 transmits the document (contract) and metadata to the document management system 10. The document management system 10 may extract metadata instead of transmitting metadata from the terminal 50 (or after the metadata is transmitted from the terminal 50).

S4: The communication unit 11 of the document management system 10 receives the document (contract) and the metadata. The screen generation unit 12 requests the data management unit 13 to store the document and the metadata.

S5: The data management unit 13 requests the document information storage unit 22 to store the document and receives a document ID "A" (first document ID) as a return value. Alternatively, for example, in a configuration in which the document information storage unit 22 and the data management unit 13 reside in the same server, the data management unit 13 assigns the document ID "A" to the document (e.g., a contract) and stores the first document ID in the document information storage unit 22 in association with the document. In this case, the data management unit 13 serves as an assignment unit to assign first identification information to the first electronic data. In either case, the data management unit 13 acquires the document ID "A."

S6: The data management unit 13 sots "A" to the document ID of the metadata. The data management unit 13 stores the metadata in the metadata storage unit 23 in association with the document ID "A."

S7: The data management unit 13 notifies the workflow/control unit 14 that the document (contract) identified by the document ID "A" is newly stored. This is because the workflow control unit 14 determines whether or not the workflow start trigger is satisfied.

S8: The workflow control unit 14 sequentially refers to the start triggers in the workflow information storage unit 24 and determines whether or not one or more of the start triggers are satisfied. For the sake of explanation, it is assumed that the start trigger is satisfied. When a document or an event satisfies a plurality of workflow start triggers, the workflow/control unit 14 may simultaneously generate a plurality of execution units 15 or may sequentially generate the plurality of execution units 15. The description is given below of a case where the start trigger of the workflow having the ID "2" is satisfied.

S9: When the start trigger is satisfied, the workflow control unit 14 generates the execution unit 15 for processing the document (contract) having the document ID "A." The execution unit 15 stores the workflow ID and the document ID "A" in the ID association storage unit 25. Thus, the workflow and the document ID "A" are associated with each other (see FIG. 8).

S10: In order to execute the first process (flow 1) specified in the workflow information, the execution unit 15 requests the data management unit 13 to acquire the document (contract) having the document ID "A."

S11: The data management unit 13 acquires the document having the document ID "A" from the document information storage unit 22.

S12: The data management unit 13 transmits to the execution unit 15 the document itself or the storage location of the document.

S13: Since the execution unit 15 performs a process corresponding to the workflow, the execution unit 15 transmits the acquired document to the electronic contract system 30 via the communication unit 11. Specifically, the electronic signature unit 32 receives the document via the communication unit 31. The execution unit 15 acquires, as a return value, a document ID "B" (second document ID) assigned by the electronic contract system 30 and used for management of the document therein. The execution unit 15 stores the document ID "B" in the ID association storage unit 25 in association with the document ID "A." Since it takes time for the electronic contract system 30 to process the document, the execution unit 15 acquires the document ID "B" as response to the transmission of the document. Accordingly, the document management system 10 can acquire the processed document (contract) from the electronic contract system 30 by specifying the document ID "B."

FIG. 10 illustrates the ID association information after step S13. A description is given below of differences between the configuration illustrated in FIG. 10 and that illustrated in FIG. 8. In FIG. 10, "B" is registered as the document ID set by and used in the electronic contract system 30. Thus, the ID association storage unit 25 associates the document ID "A" used in the document management system 10 with the document ID "B" used in the electronic contract system 30.

Description with reference to FIG. 9 is continued. S14: The execution unit 15 waits for the timing of periodical execution of the second process (flow 2) specified in the workflow information. For example, the execution unit 15 executes the second process at regular intervals after receiving the document ID from the electronic contract system 30.

S15: At the timing of the periodical execution, the execution unit 15 acquires the processed document (concluded contract) from the electronic contract system 30, specifying the document ID "B."

S16: The execution unit 15 requests the data management unit 13 to store the processed document (contract).

S17: The data management unit 13 requests the document information storage unit 22 to store the processed document and receives a document ID "C" (third document ID) as a return value. Alternatively, in the configuration in which the document information storage unit 22 and the data management unit 13 reside in the same server, the data management unit 13 assigns the document ID "C" to the processed document and stores the document ID "C" in the document information storage unit 22 in association with the document, in either case, the data management unit 13 acquires the document ID "C."

S18: Since the storing is completed, the data management unit 13 notifies the execution unit 15 of the document ID "C" to the execution unit 15. The execution unit 15 stores the document ID "C" in the ID association storage unit 25 in association with the document IDs "A" and "B."

FIG. 11 illustrates the ID association information after step S18. A description is given below of differences between FIG. 10 and FIG. 11. In FIG. 11, "C" is registered as the document ID identifying the processed document. As described above, in the ID association storage unit 25, the document ID "A" assigned by the document management system 10 (the first document ID before processing by the electronic contract system 30), the document ID "B" assigned by the electronic contract system 30 (the second document ID), and the document ID "C"(third document ID) assigned by the document management system 10 to the document having been processed by the electronic contract system 30 can be associated with each other.

Referring again to FIG. 9, the description is continued. S19: Since the execution unit 15 has acquired the three document IDs "A," "B," and "C," the execution unit 15 requests the data management unit 13 to associate the document having the document ID "A" with the document having the document ID "C." The execution unit 15 may further request association of the document ID "B" thereto.

S20: The data management unit 13 assigns association information. Specifically, the data management unit 13 sets a common value to the item "association information" of the metadata including the document ID "A" and the item "association information" of the metadata including the document ID "C," In this way, the document management system 10 can store the contract before processing by the electronic contract system 30 and the contract processed by the electronic contract system 30 in association with each other.

Alternatively, the data management unit 13 may integrate the two documents instead of associating the two documents using the association information. The integration is to create a file in which the document having the document ID "A" and the document having the document ID "C" are integrated.

Figure 12:
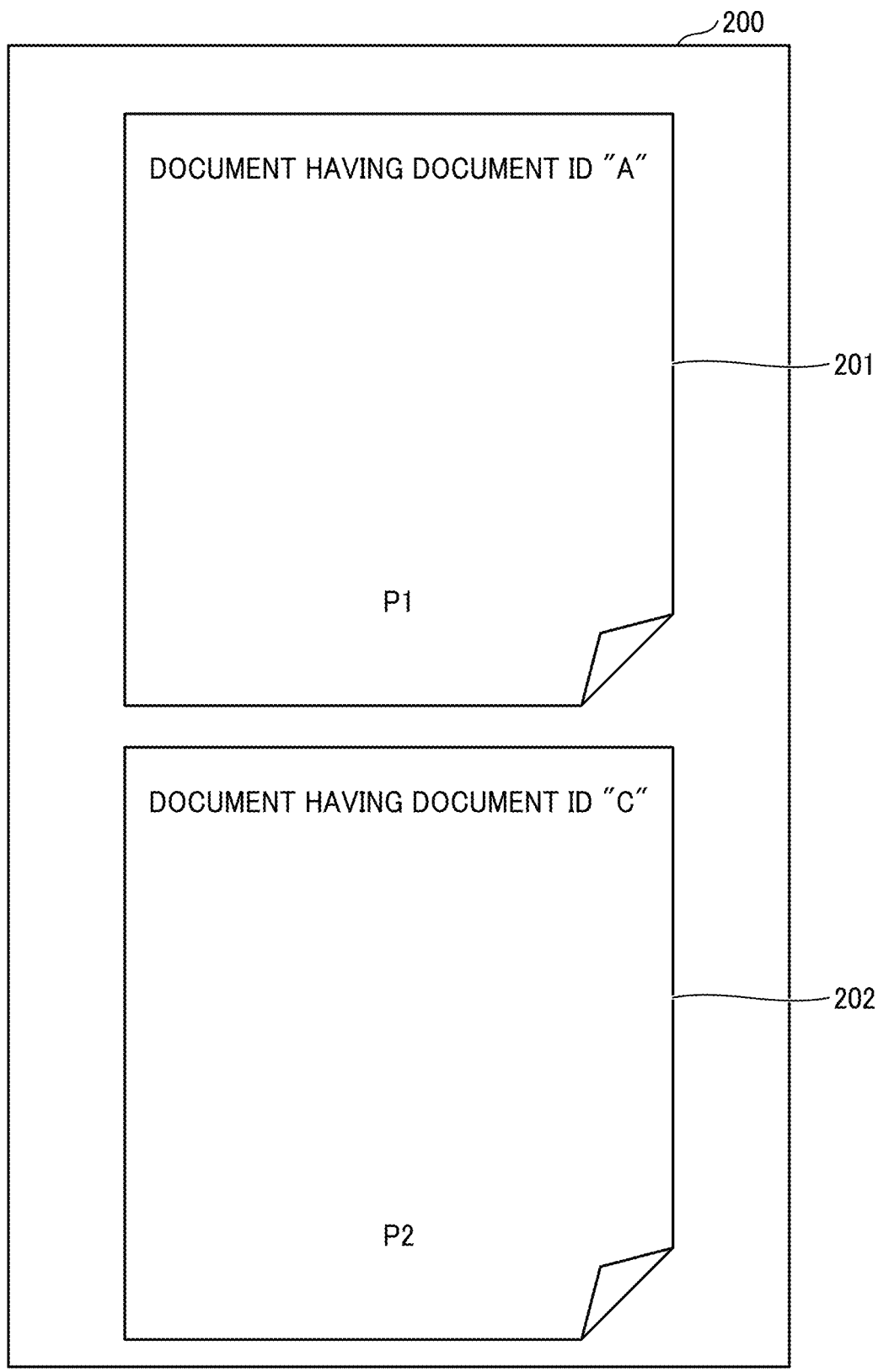
FIG. 12 is a diagram illustrating an example of integration of two documents according to embodiments.

FIG. 12 illustrates an example of integration of two documents. In FIG. 12, for convenience of explanation, it is assumed that each of the document having the document ID "A" and the document having the document ID "C" is one-page document. A new document 200 in which two documents 201 and 202 are combined is created. In the document 200, the document 201 having the document ID "A" is on page 1, and the document 203 having the document ID "C" is on page 2.

To the document 200 generated by combining, a new document ID is assigned, and metadata thereof is stored in the metadata storage unit 23. The metadata in this case may be the same as the metadata of the document 201 before combining. Since the documents before and after the processing by the electronic contract system 30 are combined, the association information is unnecessary.

Procedure of Search

Referring to FIG. 13, a description is given of a procedure for searching for a document in response to a user operation. FIG. 13 is a sequence diagram illustrating an example of the procedure for searching for a document in response to a user operation.

Figures 15, 16:
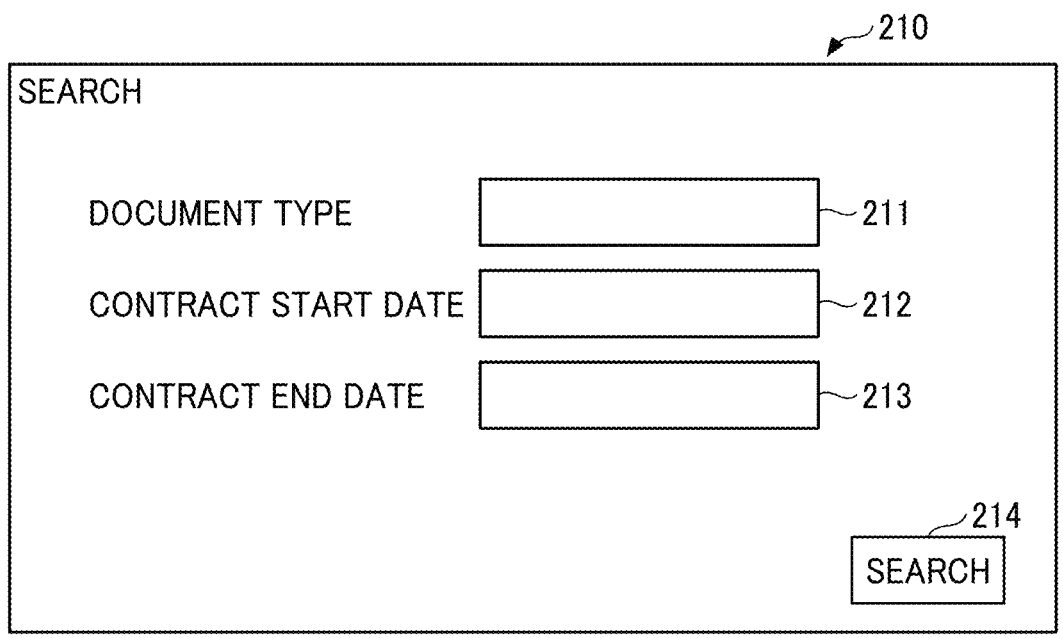
FIG. 15 is a diagram illustrating an example of a search screen displayed by the terminal according to embodiments.
FIG. 16 is a diagram illustrating an example of a document list screen displayed by the terminal according to embodiments.

S31: The user operates the terminal 50 to connect the terminal 50 to the information processing system 100. The screen generation unit 12 of the information processing system 100 generates data for a search screen in response to a user operation, and the communication unit 11 transmits screen information of the search screen to the terminal 50. An example of the search screen is illustrated in FIG. 15.

S32: The communication unit 51 of the terminal 50 receives the screen information of the search screen. The display control unit 52 displays the search screen according to the screen information generated by the screen generation unit 12. The user inputs a search key to instruct the terminal 50 to perform a search. The search key is any one of metadata stored in the metadata storage unit 23. Therefore, it is effective that the user registers the metadata to be used for the search in advance. The operation receiving unit 53 of the terminal 50 receives the operation. The communication unit 51 transmits a request for search specifying the search key, to the document management system 10.

S33: The communication unit 11 of the document management system 10 receives the request for search, and the screen generation unit 12 passes the request for search to the data management unit 13.

S34, 35: The data management unit 13 searches the metadata storage unit 23 using the search key, and acquires a search result. The search result is a list of documents (a set of metadata records) that match the search key. The data management unit 13 may acquire not only the document matching the search key but also a list of documents associated with the document matching the search key by the association information.

S36: The data management unit 13 passes the search result to the screen generation unit 12.

S37: The screen generation unit 12 generates screen information of a document list screen (an example of a first screen) using the search result. The communication unit 11 of the document management system 10 transmits the screen information (an example of first screen information) of the document list screen to the terminal 50. The communication unit 51 of the terminal 50 receives the screen information of the document list screen. The display control unit 52 displays the document list screen according to the screen information generated by the screen generation unit 12. FIG. 16 illustrates an example of the document list screen.

S38: The user selects a document from the document list screen and operates the terminal 50 to acquire the document. The operation receiving unit 53 of the terminal 50 receives the operation. The communication unit 51 transmits a request for document specifying the document ID, to the document management system 10.

S39: The communication unit 11 of the document management system 10 receives the request for document. The screen generation unit 12 passes the request for document to the data management unit 13.

S40, S41: The data management unit 13 searches the document information storage unit 22 for the document and acquires the document having the document ID. Further, the data management unit 13 determines, in the metadata storage unit 23, a document associated by the association information with the document identified by the document ID and acquires the document (may be only a file name) from the document information storage unit 22.

S42: The data management unit 13 passes these documents to the screen generation unit 12.

Figure 17:
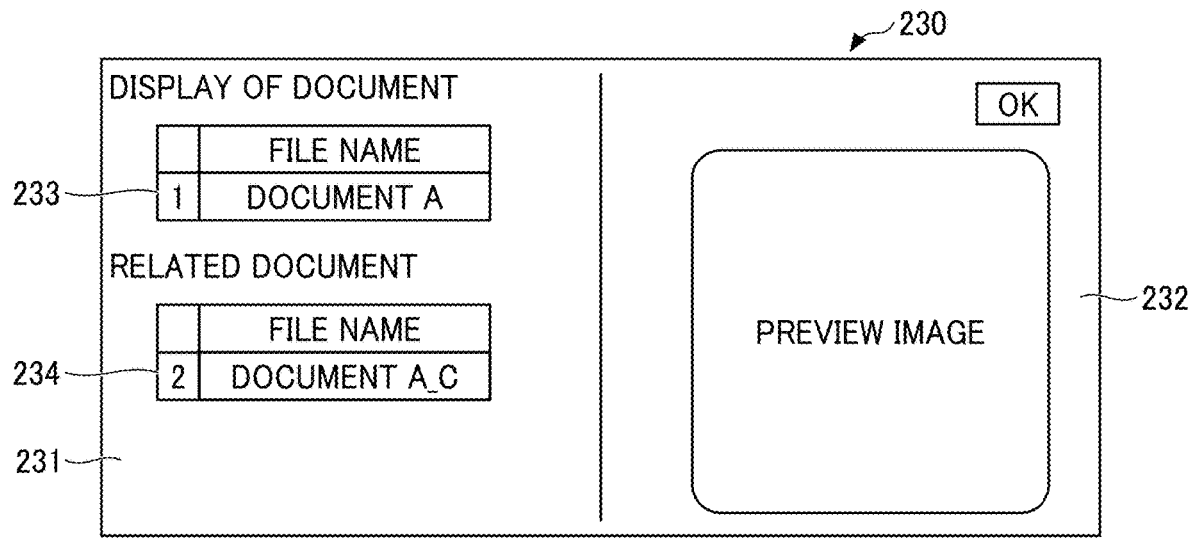
FIG. 17 is a diagram illustrating an example of a document display screen displayed by the terminal according to according to Embodiment 1.
Figure 18:
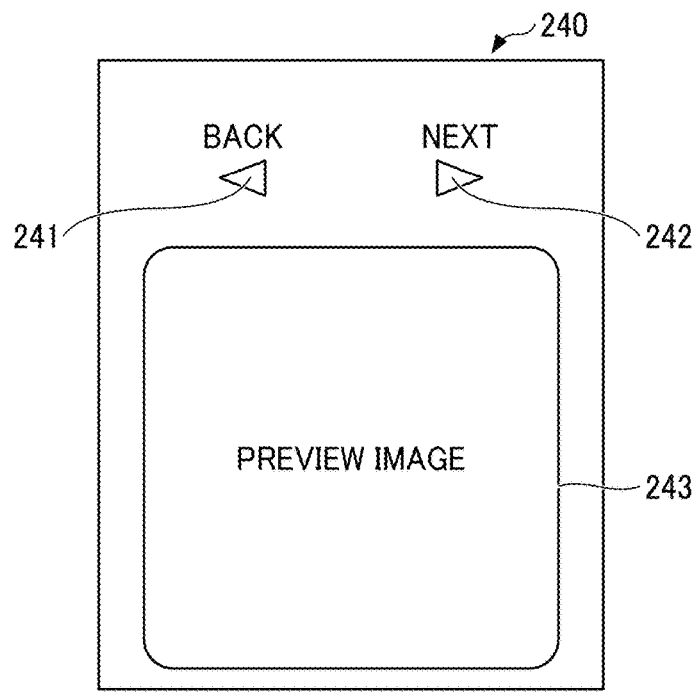
FIG. 18 is a diagram illustrating another example of a document display screen displayed by the terminal according to according to Embodiment 2.

S43: The screen generation unit 12 generates screen information of a document display screen for displaying the document identified by the document ID and the document associated with the document by the association information. The communication unit 11 of the document management system 10 transmits the screen information of the document display screen to the terminal 50. The communication unit 51 of the terminal 50 receives the screen information of the document display screen. The display control unit 52 displays the document display screen according to the screen information generated by the screen generation unit 12. Examples of the document display screen are illustrated in FIGS. 17 and 18, which are to be described later.

Examples of Screens

Figure 14A:
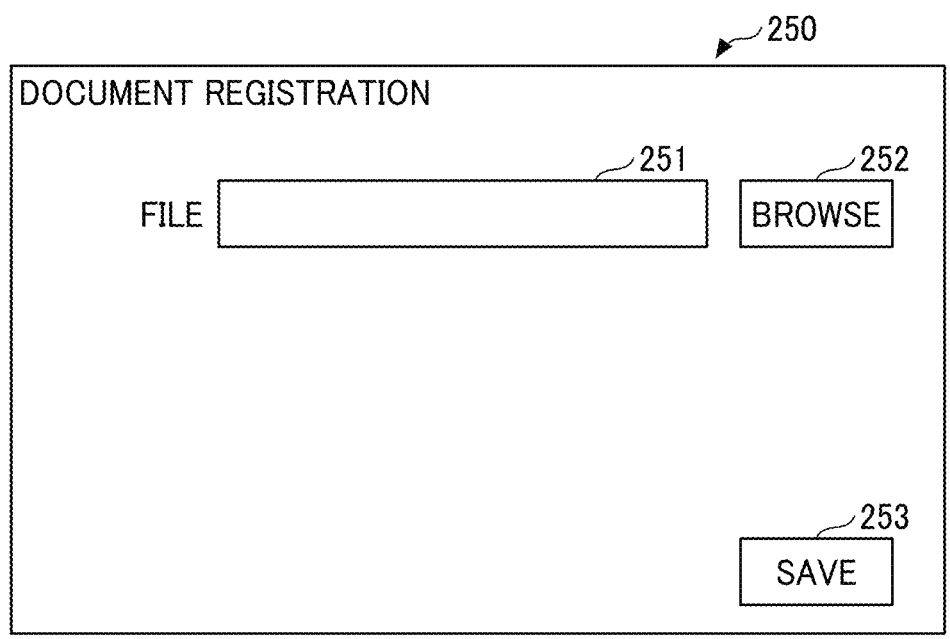
FIG. 14A is a diagram illustrating an example of a document registration screen displayed by the terminal according to according to embodiments.

FIG. 14A illustrates a document registration screen 250 as an example of the screen (e.g., web page) for document registration, displayed by the terminal 50. The document registration screen 250 includes a file name field 251, a browse button 252, and a save button 253. The user presses the browse button 252 to select a document saved in the HD 504 or the like. The file name of the selected document is displayed in the file name field 251. When the user presses the save button 253, the terminal 50 transmits the document specified in the file name field 251 to the document management system 10.

Figure 14B:
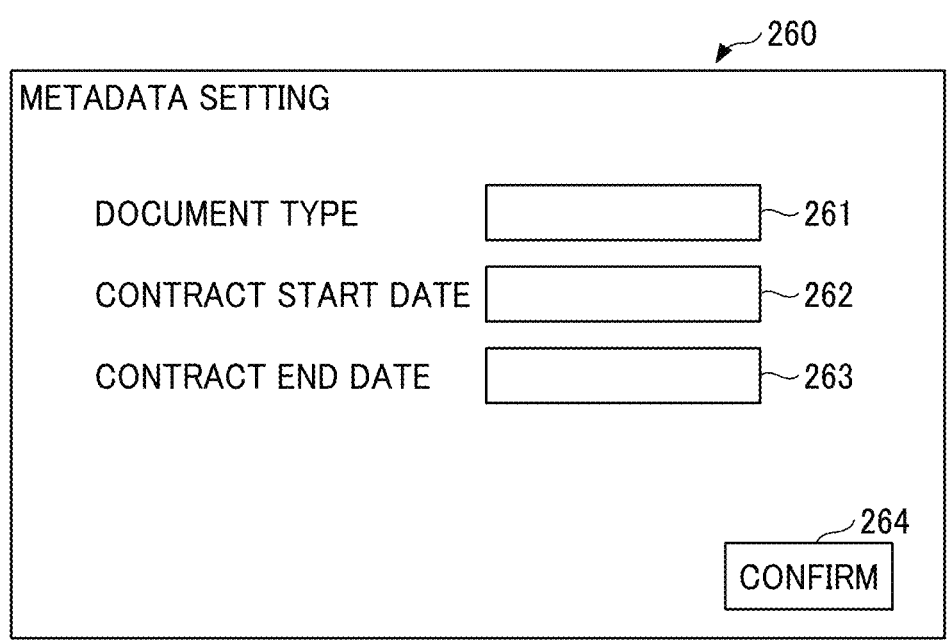
FIG. 14B is a diagram illustrating an example of a metadata setting screen displayed by the terminal according to according to embodiments.

FIG. 14B illustrates a metadata setting screen 260 as an example of the screen for setting metadata, displayed by the terminal 50. The metadata setting screen 260 includes a document type field 261, a contract start date field 262, and a contract end date field 263.

The document type field 261 is a field for the user to input a document type as one item of metadata.

The contract start date field 262 is a field for the user to input a contract start date as one item of metadata. The display control unit 52 may display a calendar, and the operation receiving unit 53 may receive a specific date from the user.

The contract end date field 263 is a field for the user to input a contract end date as one item of metadata. The display control unit 52 may display a calendar, and the operation receiving unit 53 may receive a specific date or a range from the user.

When the user sets the metadata and presses a confirm button 264, the terminal 50 transmits the metadata to the document management system 10.

FIG. 15 is a diagram illustrating a search screen 210 an example of the search screen displayed by the terminal 50. The search screen 210 includes a document type field 211, a contract start date field 212, a contract end date field 213, and a search button 214.

The document type field 211 is a field for the user to input a search key for searching for the document type as an item of the metadata.

The contract start date field 212 is a field for the user to input a search key for searching for a contract start date as an item of the metadata. The display control unit 52 may display a calendar, and the operation receiving unit 53 may receive a specific date or a range from the user.

The contract end date field 213 is a field for the user to input a search key for searching for a contract end date as an item of the metadata. The display control unit 52 may display a calendar, and the operation receiving unit 53 may receive a specific date or a range from the user.

The search button 214 is a button for instructing the terminal 50 to transmit a request for search to the document management system 10.

Note that FIG. 15 is merely an example, and there may be an entry field for a file name and an entry field for a free keyword. There may be an entry field for a document ID. When the search button 214 is pressed, the screen transitions to a document list screen 220.

FIG. 16 is a diagram illustrating an example of the document list screen 220 displayed by the terminal 50. The document list screen 220 includes, as list items, a file name filed 221 for a document matching the search, a document type field 222 a contract start date field 223, and a contract end date field 224. That is, the document list screen 220 displays at least a part of the items of the metadata in the metadata storage unit 23 for each record (one line) that matches the search. The terminal 50 receives a user operation via the document list screen 220. In FIG. 16, since the type of all documents is "basic contract," it is considered that the user inputs a search key "basic contract" in the document type column on the search screen 210.

The user selects one or more documents and presses the open button 225. Thus, the terminal 50 can display the body (file) of the selected document.

FIG. 17 illustrates a document display screen 230 as an example of the document display screen. The document display screen 230 includes a document information field 231 and a preview field 232. The document information field 231 includes a first document field 233 and a second document field 234. The first document field 233 displays the file name of the document selected by the user on the document list screen 220. The second document field 234 displays the file name of the document associated by the association information with the document in the first document field 233.

The preview field 232 displays a preview of the document in the first document field 233 or the second document field 234 selected by the user in the document information field 231. The preview displayed in the preview field 232 immediately after the document is displayed may be, for example, page 1 of the document. It is preferable that the document display screen 230 receives a user button operation for page feeding or page returning.

Although only one file name is displayed in the second document field 234 in FIG. 17, a plurality of file names may be displayed in the second document field 234 in some cases. There is a case in which, in the workflow, a system different from the electronic contract system 30 further processes the same document.

In FIG. 17, the document selected by the user on the document list screen 220 and the document associated by the association information with the selected document are displayed, but only one thereof may be displayed.

FIG. 18 illustrates a document display screen 240 as another example of the document display screen. The document display screen 240 of FIG. 18 includes a back 241, a next button 242, and a preview field 243. The preview field 243 displays a preview of the document selected by the user on the document list screen 220 and a preview of the document associated by the association information with the selected document. The user can select the page of each document by pressing the back button 241 and the next button 242, and can display another document when reaching the last page.

As described above, in the information processing system 100 according to the present embodiment, the document management system 10 stores three document IDs, the first document ID "A," the second document ID "B," and the third document ID "C" in association with each other. Therefore, when the user searches for a document and determines the first document ID "A" of the document, the document management system 10 can also determine the processed document (concluded contract) identified by the third document ID "C." The document management system 10 can also request the electronic contract system 30 to transmit the processed document (concluded contract), using the second document ID "B" assigned by the electronic contract system 30.

Embodiment 2

In the information processing system 100 according to the present embodiment, the document management system 10 stores a document ID used for document control in the document management system 10 and a document ID used for document management in an external service system in association with each other.

Outline of Operation

Figure 19:
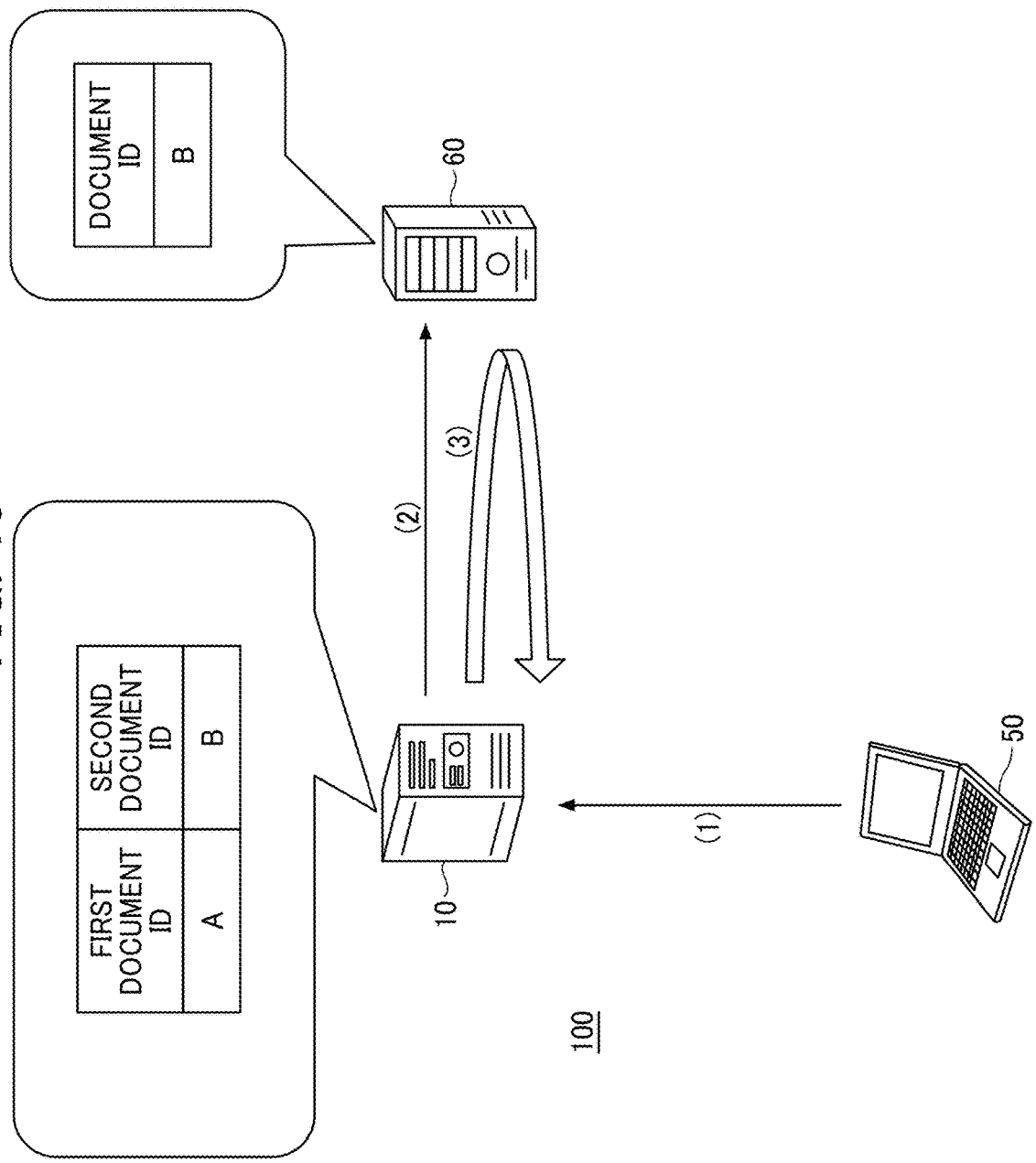
FIG. 19 is a diagram illustrating an outline of a method of controlling electronic data performed by a document management system according to Embodiment 4.

FIG. 19 is a diagram illustrating an outline of an electronic data management method performed by a document management system 10. In the description referring to FIG. 19, for simplicity, mainly differences from FIG. 1 are described. The document management system 10 according to the present embodiment controls a document before processed by an external service system 60 and a document having been processed by the external service system 60 in association with each other. As described above, two document IDs are used for the association.

(1) A user operates the terminal 50 to create a document and uploads the document to the document management system 10. The document management system 10 stores the document (an example of first electronic data) and assigns a document ID "A" (an example of first identification information and also referred to as "first document ID") thereto to control the document.

(2) The document management system 10 requests the external service system 60 to process the document. As will be described later, this processing differs depending on the external service system 60 and may be any processing. The external service system 60 performs processing on the document. Then, the external service system 60 transmits, to the document management system 10, a document ID "B" (an example of second identification information and also referred to as "second document ID") assigned by the external service system 60 and used for document management therein. The external service system 60 stores the processed document (an example of second electronic data) in association with the document ID "B."

(3) The document management system 10 stores the document ID "A" and the document ID "B" in association with each other.

With such operation, the document management system 10 can store the first document ID "A" used for document control in the document management system 10 and the second document ID "B" used for document control in the external service system 60 in association with each other. Therefore, the user can control the document in the document management system 10 and the document in the external service system 60 by using the document management system 10.

System Configuration

A configuration of an information processing system 100 is described with reference to FIG. 20.

Figure 20:
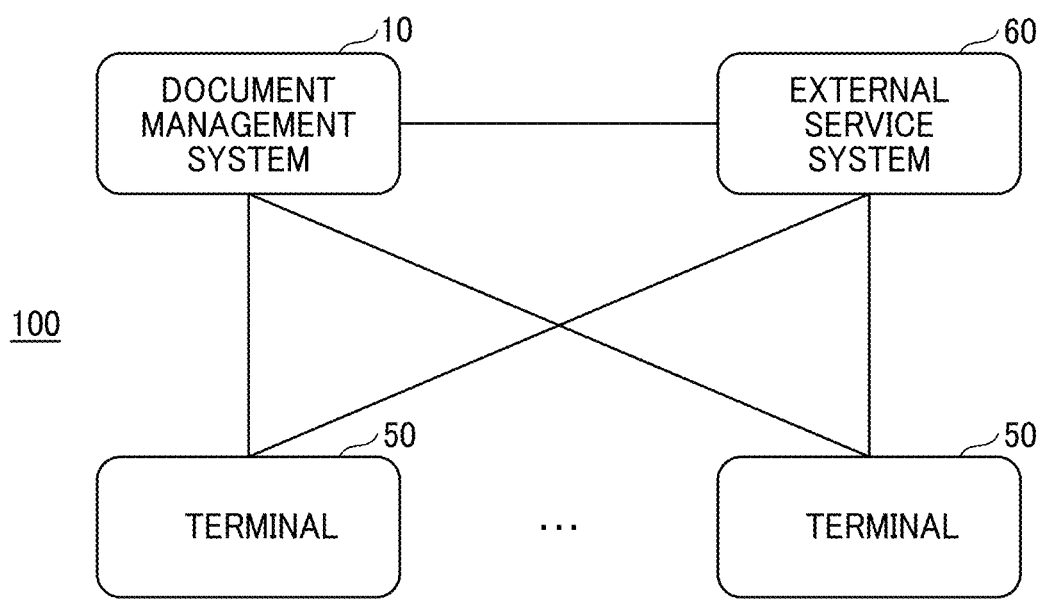
FIG. 20 is a schematic block diagram illustrating a configuration of an information processing system according to Embodiment 2.

FIG. 20 is a schematic block illustrating an example of the configuration of the information processing system 100. In the description referring to FIG. 20, for simplicity, mainly differences from FIG. 2 are described. As illustrated in FIG. 20, in the present embodiment, the electronic contract system 30 of Embodiment 1 is replaced with the external service system 60.

The external service system 60 includes one or more information processing apparatuses. The external service system 60 performs predetermined processing on the document received from the document management system 10. Examples of the predetermined processing include, but are not limited to, optical character recognition (OCR) processing, translation, PDF conversion processing, image processing such as video processing, audio processing such as conversion of text data into audio data and audio data processing such as voice recognition, file combining processing, and electronic contract processing.

The external service system 60 may be integral with the document management system 10. The external service system 60 may be implemented by cloud computing or may be implemented by a single information processing apparatus. The external service system 60 may be located on the Internet or on-premises.

Functions

Figure 21:
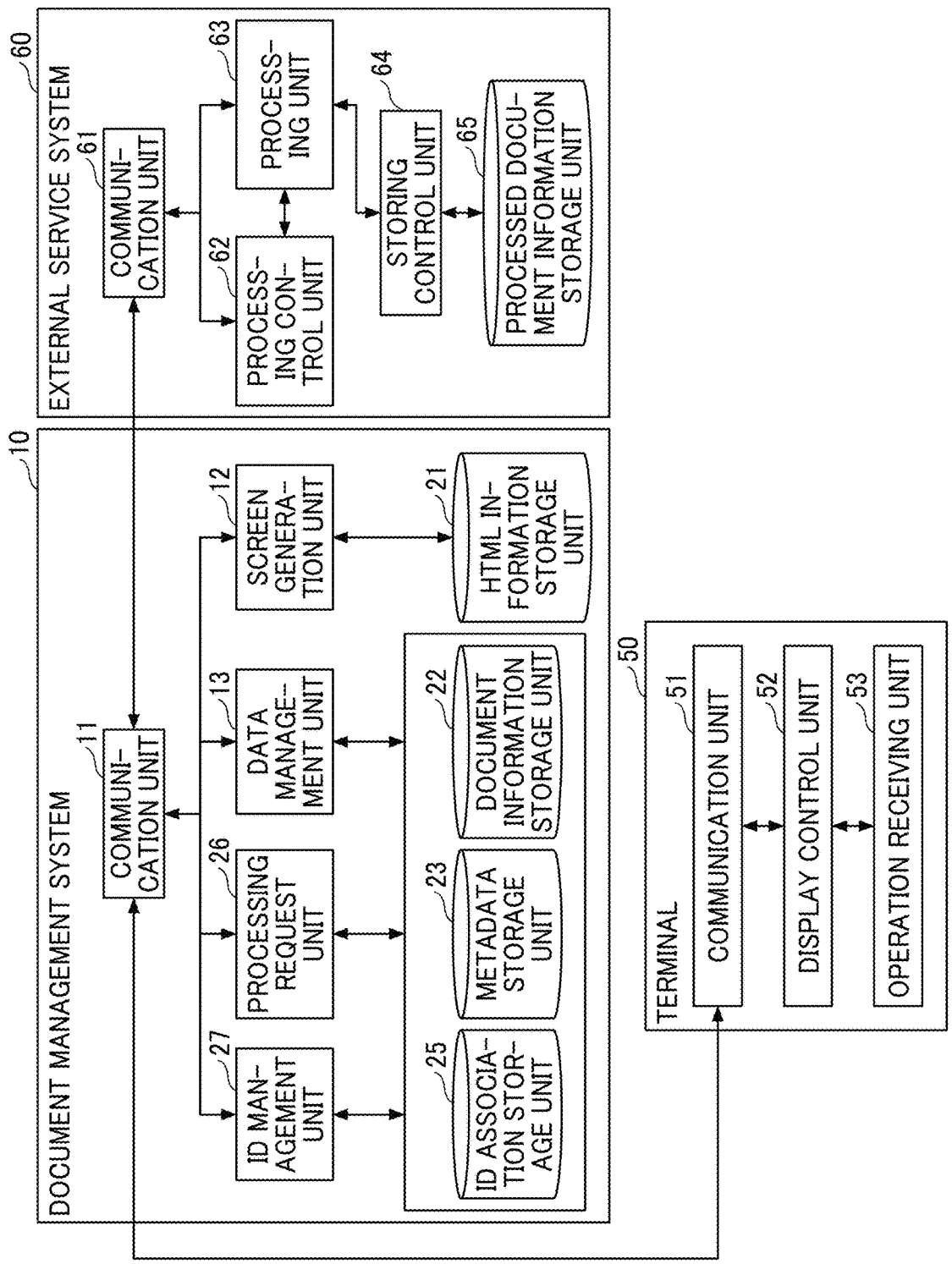
FIG. 21 is a block diagram illustrating functional configurations of the document management system, an electronic contract system, and a terminal according to Embodiment 2.

FIG. 21 is a block diagram illustrating an example of functional configurations of the document management system 10, the external service system 60, and the terminal 50. In the description referring to FIG. 21, for simplicity, mainly differences from FIG. 4 are described. The function of the terminal 50 may be similar to that in FIG. 4.

Document Management System

In the present embodiment, executing a workflow is not a requisite for the document management system 10, and the document management system 10 does not have functions related to workflow execution. The document management system 10 does not include the workflow control unit 14, the execution unit 15, and the workflow information storage unit 24. However, the document management system 10 according to the present embodiment may execute a workflow.

The data management unit 13 controls document information stored in the document information storage unit 22 and metadata stored in the metadata storage unit 23. The configurations of the document information storage unit 22 and the metadata storage unit 23 may be the same as those in Embodiment 1.

In the present embodiment, the document management system 10 includes a processing request unit 26 and an identification information (ID) management unit 27. The processing request unit 26 requests the external service system 60 to process a document transmitted by the terminal 50 and acquires a document ID assigned by the external service system 60 for document control in the external service system 60.

The ID management unit 27 assigns a document ID (first identification information) for identifying a document transmitted from the terminal 50, and stores the document and a document ID (second identification information) transmitted from the external service system 60 in association with each other in the ID association storage unit 25.

FIG. 22 is a diagram schematically illustrating the ID association information stored in the ID association storage unit 25 in the present embodiment. As illustrated in FIG. 22, the ID association storage unit 25 stores the document ID used by the document management system 10 and the document ID used by the external service system 60 in association with each other. The document ID for controlling the document in the external service system 60 may be assigned before the external service system 60 actually processes the document.

External Service System

The description with reference to FIG. 21 is continued. The external service system 60 includes a communication unit 61, a processing control unit 62, a processing unit 63, a storing control unit 64, and a processed document information storage unit 65. These functions of the external service system 60 are implemented by the CPU 501 of the computer 500 illustrated in FIG. 3 executing a program stored in the ID 504.

The communication unit 61 communicates with the document management system 10 to transmit or receive various information (data). In the present embodiment, the communication unit 61 receives, from the document management system 10, a document to be processed and transmits, to the document management system 10, the second document ID assigned and used by the external service system 60 to control the document.

The processing control unit 62 executes processing set in advance in the external service system 60. This processing may be any processing. As described above, examples thereof include OCR processing, PDF conversion processing, image processing, audio processing, file combining processing, and electronic contract processing. When the external service system 60 executes a plurality of processes, the processing control unit 62 may control the order of execution of the plurality of processes. Further, the processing control unit 62 assigns, to the document to be processed, the second document ID used in the external service system 60.

The processing unit 63 is a module that actually performs processing. The processing control unit 62 calls the processing unit 63 to execute various types of processing on a document. The processing unit 63 may be prepared for each of processing such as OCR processing, PDF conversion processing, image processing, audio processing, file combining processing, and electronic contract processing.

The storing control unit 64 stores the document processed by the processing unit 63 in the processed document information storage unit 65 in association with the second document ID assigned by the processing control unit 62. Further, in response to receiving, from the document management system 10, a request for transmitting the processed document specified by the second document ID used in the external service system 60, the storing control unit 64 transmits the document to the document management system 10 via the communication unit 61.

FIG. 23 schematically illustrates processed document information stored in the processed document information storage unit 65. The processed document information is information on a document (e.g., second electronic data) having been processed by the external service system 60. Items of the processed document information are described below.

The item "document ID" is the document ID of the document assigned by the external service system 60.

The item "file name" is a file name of the document processed by the processing unit 63. The storing control unit 64 creates a file name by, for example, adding the document ID used in the external service system 60 to the original file name.

The item "date of processing" is the date and time when the processing unit 63 has processed the document or when the storing control unit 64 has stored the processed document.

Figure 24:
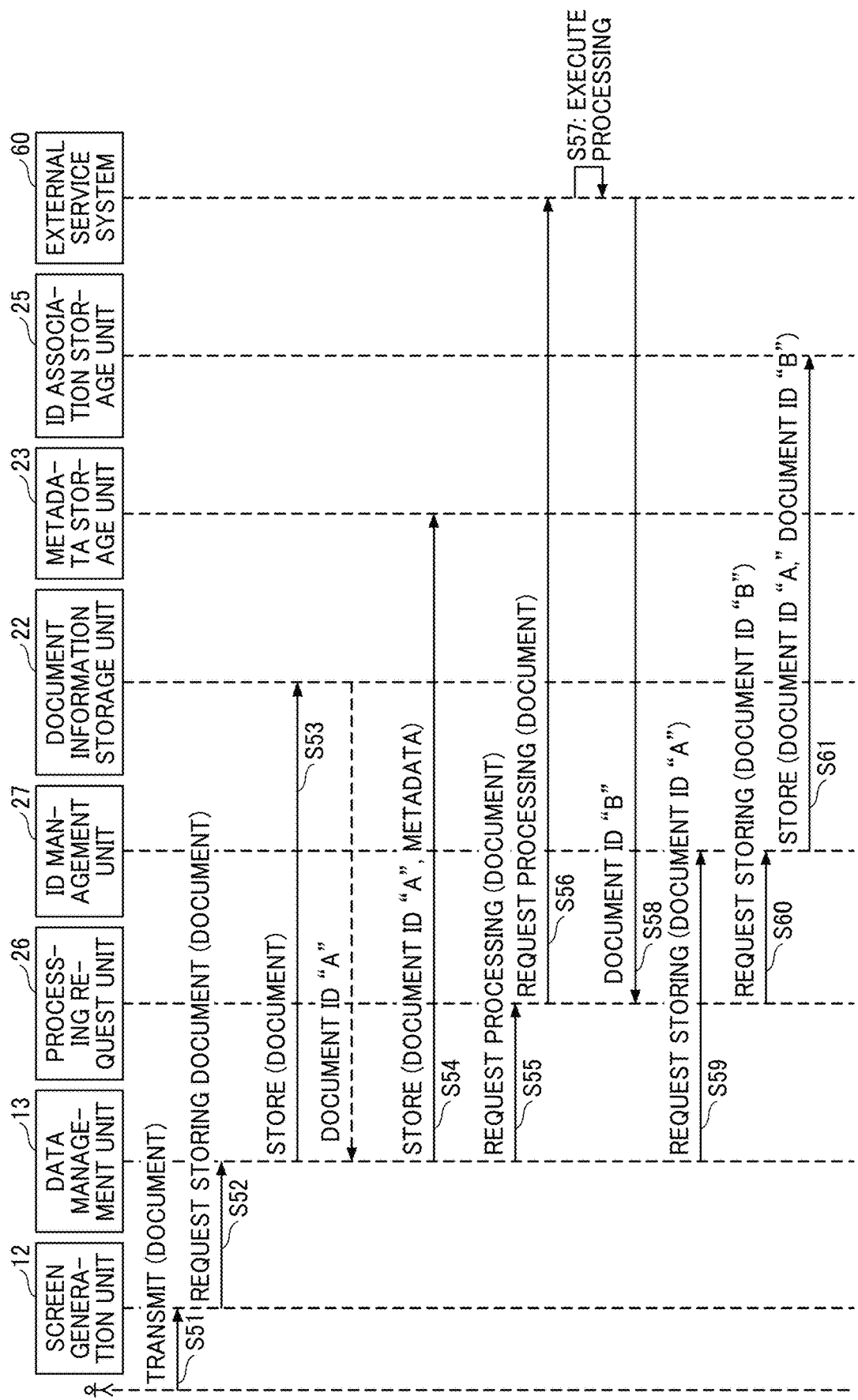
FIG. 24 is a sequence diagram illustrating an example of a procedure for the document management system according to Embodiment 2 to store the document ID used by the document management system and the document ID used by the external service system in association with each other.

Storing of Document ID Assigned by Document Management System and Document ID Assigned by External Service System Next, a procedure for storing document IDs will be described with reference to FIG. 24. FIG. 24 is a sequence diagram illustrating an example of a procedure for the document management system 10 to store the document ID used by the document management system 10 and the document ID used by the external service system 60 in association with each other.

S51: The user operates the terminal 50 to create a document. The document may be a contract document as in Embodiment 1 or may be a simple file generated by an application such as word processing software or presentation software. The document management system 10 may support the creation of the document. In this case, the terminal 50 executes a web application provided by the document management system 10 to guide, for example, user's inputting or selecting of text to create a desired document.

Next, the terminal 50 displays a web page for document registration generated by the screen generation unit 12. The user uploads (transmits) the document to the document management system 10 from the web page. The user inputs, to the terminal 50, an operation of transmitting the document to the document management system 10. The user sets a desired metadata item and inputs a value. The operation receiving unit 53 of the terminal 50 receives the operation, and the communication unit 51 transmits the document and the metadata to the document management system 10. The document management system 10 may extract metadata instead of transmitting metadata from the terminal 50 (or after the metadata is transmitted from the terminal 50).

S52: The communication unit 11 of the document management system 10 receives the document and the metadata. The screen generation unit 12 requests the data management unit 13 to store the document and the metadata.

S53: The data management unit 13 requests the document information storage unit 22 to store the document and receives a document ID "A" (first document ID) as a return value. Although the data management unit 13 receives the document ID "A" as a return value in FIG. 24, alternatively, the data management unit 13 assigns the document ID "A" to the document and stores the document ID "A" in the document information storage unit 22 in association with the document. In either case, the data management unit 13 acquires the document ID "A."

S54: The data management unit 13 sets "A" to the document ID of the metadata. The data management unit 13 stores the metadata in the metadata storage unit 23 in association with the document ID "A."

S55: The data management unit 13 transmits a document processing request to the processing request unit 26.

S56: The processing request unit 26 transmits the document processing request to the external service system 60 via the communication unit 11. In a case where the external service system 60 can perform a plurality of processes, the processing request unit 26 specifies the content of the processing. The data management unit 13 does not need to transmit (but may transmit) the document ID "A" to the external service system 60. When the first document ID is transmitted, the external service system 60 can also store the first document ID assigned by the document management system 10 and the second document ID assigned by the external service system 60 in association with each other.

S57: When the communication unit 61 of the external service system 60 receives the document processing request, the processing control unit 62 assigns, to the document, the document ID "B" used in the external service system 60. The document ID may be assigned after the processing unit 63 processes the document. The processing control unit 62 requests the processing unit 63 to perform the requested processing. The processing unit 63 processes the document. The storing control unit 64 stores the processed document in the processed document information storage unit 65 in association with the document ID "B."

S58: The communication unit 61 of the external service system 60 transmits, to the document management system 10, the document ID "(B)" used by the external service system 60 to control the document. The processing request unit 26 of the document management system 10 receives the document ID "B" via the communication unit 11.

In step S58, the external service system 60 transmits as a response the document ID to the document management system 10 after the processing. Alternatively, the external service system 60 may transmit the document ID to the document management system 10 immediately after receiving the processing request.

S59: The data management unit 13 requests the ID management unit 27 to store the document ID "A" in the ID association storage unit 25.

S60: The processing request unit 26 requests the ID management unit 27 to store the document ID "B" in the ID association storage unit 25.

S61: The ID management unit 27 stores the document IDs "A" and "B" in association with each other in the ID association storage unit 25.

Procedure of Search

Figure 25:
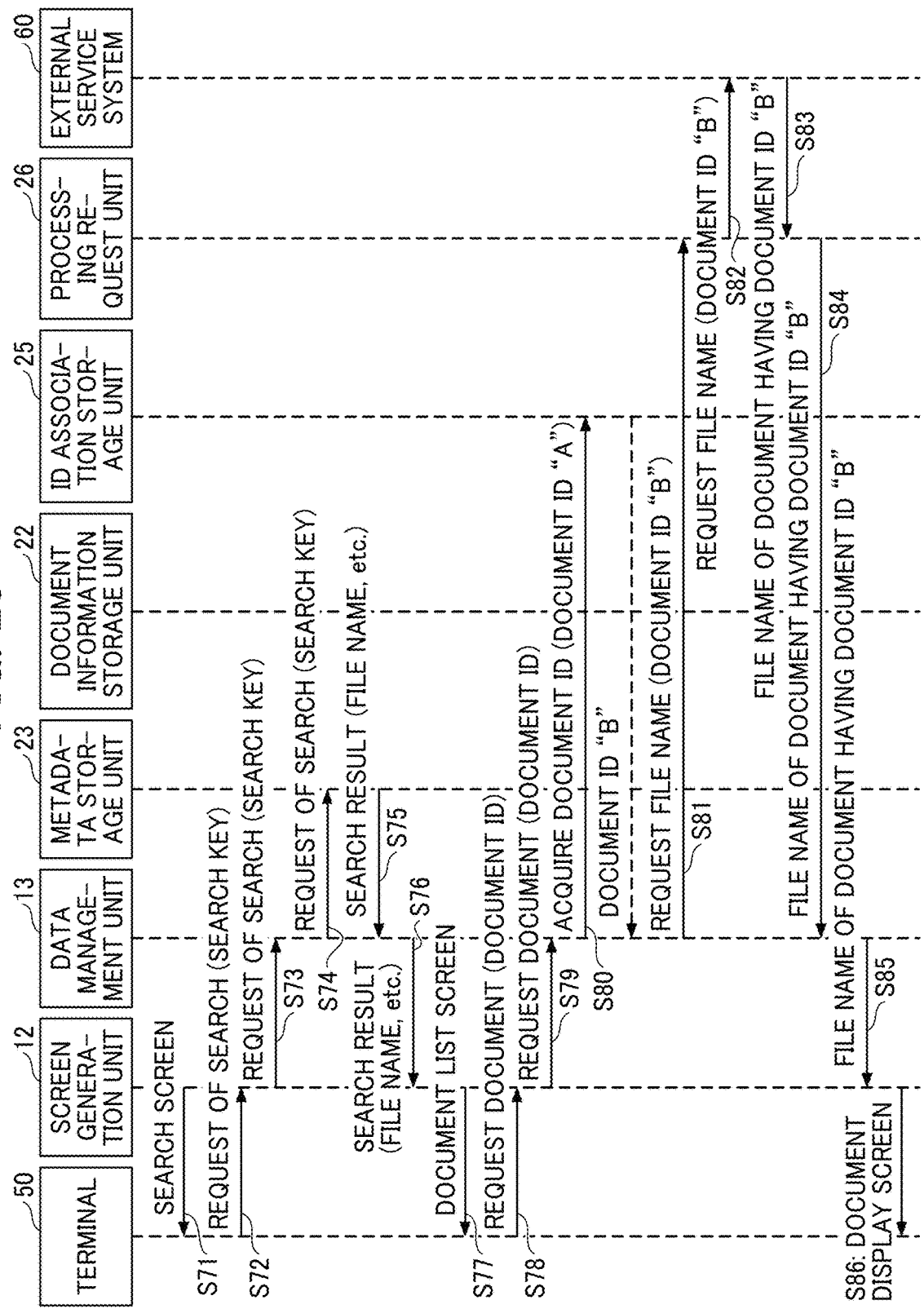
FIG. 25 is a sequence diagram illustrating an example of the procedure for searching for a document in response to a user operation, according to Embodiment 2.

Referring to FIG. 25, a description is given of a procedure for searching for a document in response to a user operation. In the description referring to FIG. 25 for simplicity, mainly differences from FIG. 13 are described. The process from S71 through S79 may be similar to the process from S31 through S39 in FIG. 13.

S80: The data management unit 13 acquires, from the ID association storage unit 25, the second document ID "B"

(used in the external service system 60) associated with the first document ID "A" selected by the user.

S81: The data management unit 13 specifies the document ID "B" and requests the processing request unit 26 to transmit the file name used in the external service system 60.

S82: In response to the request, the processing request unit 26 requests the external service system 60 to transmit the file name of the document associated with the document ID "B" via the communication unit 11.

S83: The communication unit 61 of the external service system 60 receives the request, and the storing control unit 64 acquires the file name of the document associated with the document ID "B" from the processed document information storage unit 65. The communication unit 61 transmits the file name of the document associated with the document ID "B" to the document management system 10. Preferably, the storing control unit 64 embeds a storage location such as a URI or a file path indicating the storage location of the document in the file name. The external service system 60 may transmit the file itself to the document management system 10.

The processing request unit 26 of the document management system 10 receives the file name of the document having the document ID "B" via the communication unit 11.

S84: The processing request unit 26 transmits the file name of the document having the document ID "B" to the data management unit 13.

S85: The data management unit 13 passes the file name of document having the document ID "B" to the screen generation unit 12.

S86: The screen generation unit 12 generates screen information of a document display screen (an example of second screen information) for displaying the file names of the documents having the document IDs "A" and "B." The storage locations of the documents having the document IDs "A" and "B" are embedded in the file names, respectively, on the document display screen. Alternatively, when the external service system 60 transmits the file to the document management system 10, the file may be attached to the document display screen.

The communication unit 11 of the document management system 10 transmits the screen information of the document display screen to the terminal 50. The communication unit 51 of the terminal 50 receives the screen information of the document display screen. The display control unit 52 displays the document display screen (see FIG. 26, described later) according to the screen information generated by the screen generation unit 12.

Examples of Screen

A description is given of examples of the screen displayed by the terminal 50. The screens for document registration, metadata setting, search, and document list may be respectively the same as the document registration screen 250 in FIG. 14A, the metadata setting screen 260 in FIG. 14B, the search screen 210 in FIG. 15, and the document list screen 220 in FIG. 16 according to Embodiment 1.

Figure 26:
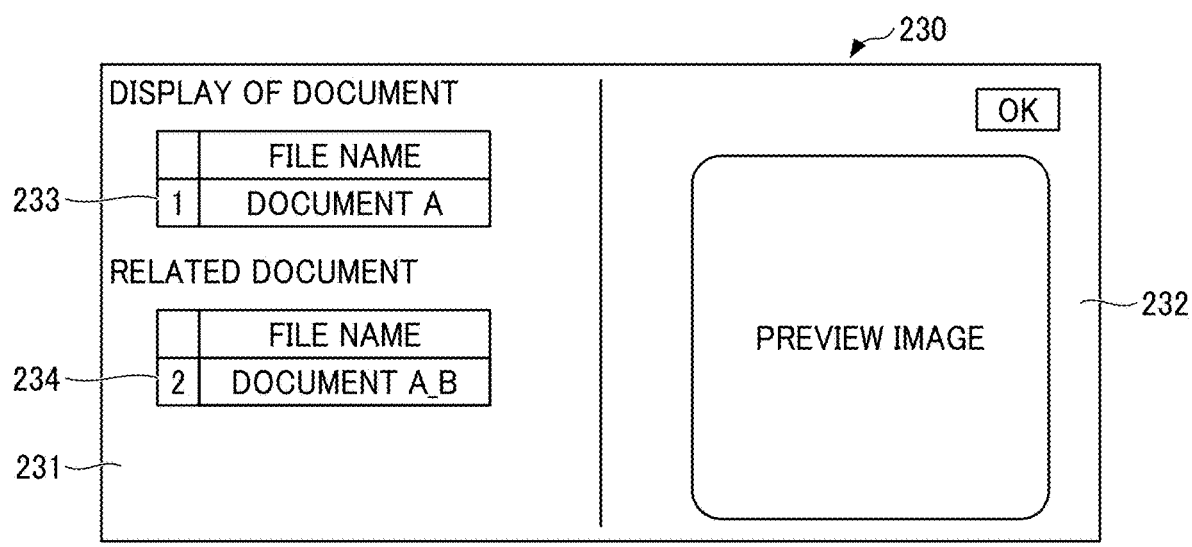
FIG. 26 is a diagram illustrating an example of a document display screen according to Embodiment 2.

FIG. 26 illustrates the document display screen 230 as an example of the document display screen according to Embodiment 2. In the following description with reference to FIG. 26, differences from FIG. 17 are described.

On the document display screen 230 in FIG. 26, the file name "document_A_B" of the document controlled by the external service system 60 is presented in the second document field 234. This document is associated with the document ID of the document presented in the first document field 233 in the ID association storage unit 25.

In this way, the user can know the file name of the document controlled by the external service system 60 by selecting the document registered in the document management system 10. To the file name "document_A_B," the document ID is attached separately from the file name.

A storage location such as a URL or a file path may be embedded as a link in the file name of the document controlled by the external service system 60. The link is embedded when the external service system 60 transmits the file name of the document to the document management system 10. With this configuration, the terminal 50 displays the document processed by the external service system 60 when the user presses the file name of the document with a pointing device such as a mouse.

The document management system 10 according to Embodiment 2 stores the first document ID "A" used for document control in the document management system 10 and the second document ID "B" used for document control in the external service system 60 in association with each other. This configuration enables the user to control the document in the document management system 10 and the document in the external service system 60 by using the document management system 10.

An aspect of the present disclosure concerns an information processing system including an information processing apparatus connected via a network with a terminal and an external service system that performs predetermined processing on electronic data.

The terminal transmits electronic data to the information processing apparatus.

The information processing apparatus includes: a communication unit to receive first electronic data and a request for processing on the first electronic data from the terminal; an identification information management unit to assign, to the first electronic data, first identification information for controlling the first electronic data; and a processing request unit to transmit the request for processing on the first electronic data to the external service system, and acquire, from the external service system, second identification information used by the external service system for controlling the first electronic data. The identification information management unit stores the second identification information acquired by the processing request unit in association with the first identification information.

Embodiment 3

There are cases where information on electronic data having been processed by an external service system is not associated with identification information used by an information processing apparatus to control the electronic data. For example, control of the electronic data in the information processing apparatus is not coordinated with control of the electronic data in the external service system. That is, in the information processing apparatus, the electronic data before processing is not associated with information on the processed electronic data. Such a system does not enable the user to confirm the processed electronic data using the information on processing apparatus.

The present embodiment provides an information processing apparatus that associates information related to electronic data processed by an external service system with identification information used by the information processing apparatus to control the electronic data.

The information processing apparatus according to the present embodiment associates information on electronic data having been processed by the external service system with identification information used by the information processing apparatus to control the electronic data.

In the information processing system 100 according to Embodiment 3, the document management system 10 stores a document ID used by the document management system 10 to control a document in association with information on a corresponding document controlled by the external service system 60.

Outline of Operation

Figure 27:
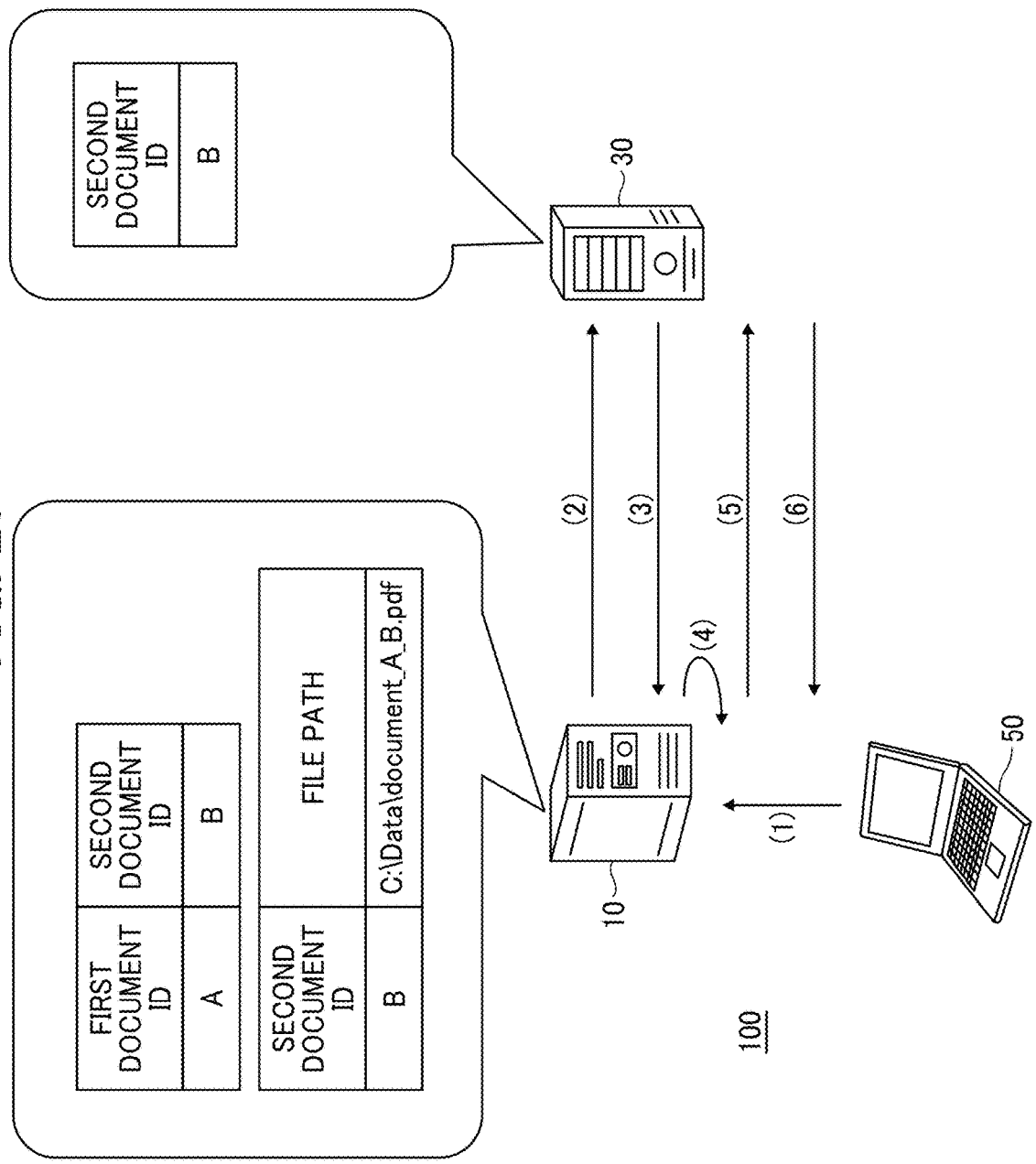
FIG. 27 is a diagram illustrating an outline of a method of controlling electronic data performed by a document management system according to Embodiment 3.

FIG. 27 is a diagram illustrating an outline of a method of controlling electronic data performed by the document management system 10 according to Embodiment 3. In the description referring to FIG. 27, for simplicity, mainly differences from FIG. 1 are described. The document management system 10 according to the present embodiment stores a document ID of a document before processed by the external service system 60 in association with information on a corresponding document controlled by the external service system 60.

(1) A user operates the terminal 50 to create a document and uploads the document to the document management system 10. The document management system 10 stores the document (an example of first electronic data) and assigns a document ID "A" (an example of first identification information and also referred to as "first document ID") thereto to control the document.

(2) The document management system 10 requests the external service system 60 to process the document. As will be described later, this processing differs depending on the external service system 60, and may be any processing.

(3) The external service system 60 assigns, to the document, a document ID "B" (an example of second identification information and also referred to as "second document ID") to control the document. Then, the external service system 60 transmits the document ID "B" to the document management system 10.

(4) The document management system 10 stores the document ID "A" and the document ID "B" in association with each other.

With the above processing, the document management system 10 stores the document ID "A" assigned before processing and the document ID "B" in association with each other.

(5) The document management system 10 specifies the document ID "B" and requests a document (an example of second electronic data) processed by the external service system 60. The document management system 10 does not know the time at which the external service system 60 ends the processing of the document. Accordingly, the document management system 10 requests the processed document from the external service system 60 at a predetermined timing. For example, the document management system 10 executes polling to prompt the external service system 60 to transmit the processed document at regular intervals. Another example of the predetermined timing is when the external service system 60 completes the processing. Specifically, in some cases, the document management system 10 receives a notification of the end of processing from the external service system 60 or knows the timing at which the external service system 60 ends the processing of the document. In such cases, the document management system 10 requests the document processed by the external service system 60 at such a timing.

(6) The external service system 60 processes the document assigned with the document ID "B" and stores the processed document in association with the document ID "B." The external service system 60 transmits, to the document management system 10, the information on the processed document requested by the document management system 10. The information on the processed document may be the document itself or a storage location (such as a URL or a file path).

With the above processing, the document management system 10 stores the information on the processed document in association with the document ID "A" assigned to the document before processing. This configuration enables the user to acquire the document processed by the external service system 60 by using the document management system 10.

The information on the second electronic data (information on the processed document) includes at least one of the second electronic data itself, a storage location of the second electronic data, bibliographic information such as a file name of the second electronic data, and identification information thereof.

Control (management) of electronic data refers to maintaining the electronic data so that each piece of the electronic data can be stored, processed, utilized, moved, discarded, or the like and the holder of the electronic data is identified.

The configuration of the information processing system 100 according to Embodiment 3 is similar to that of Embodiment 2 illustrated in FIG. 20, and thus the redundant description is omitted.

Functions

Figure 28:
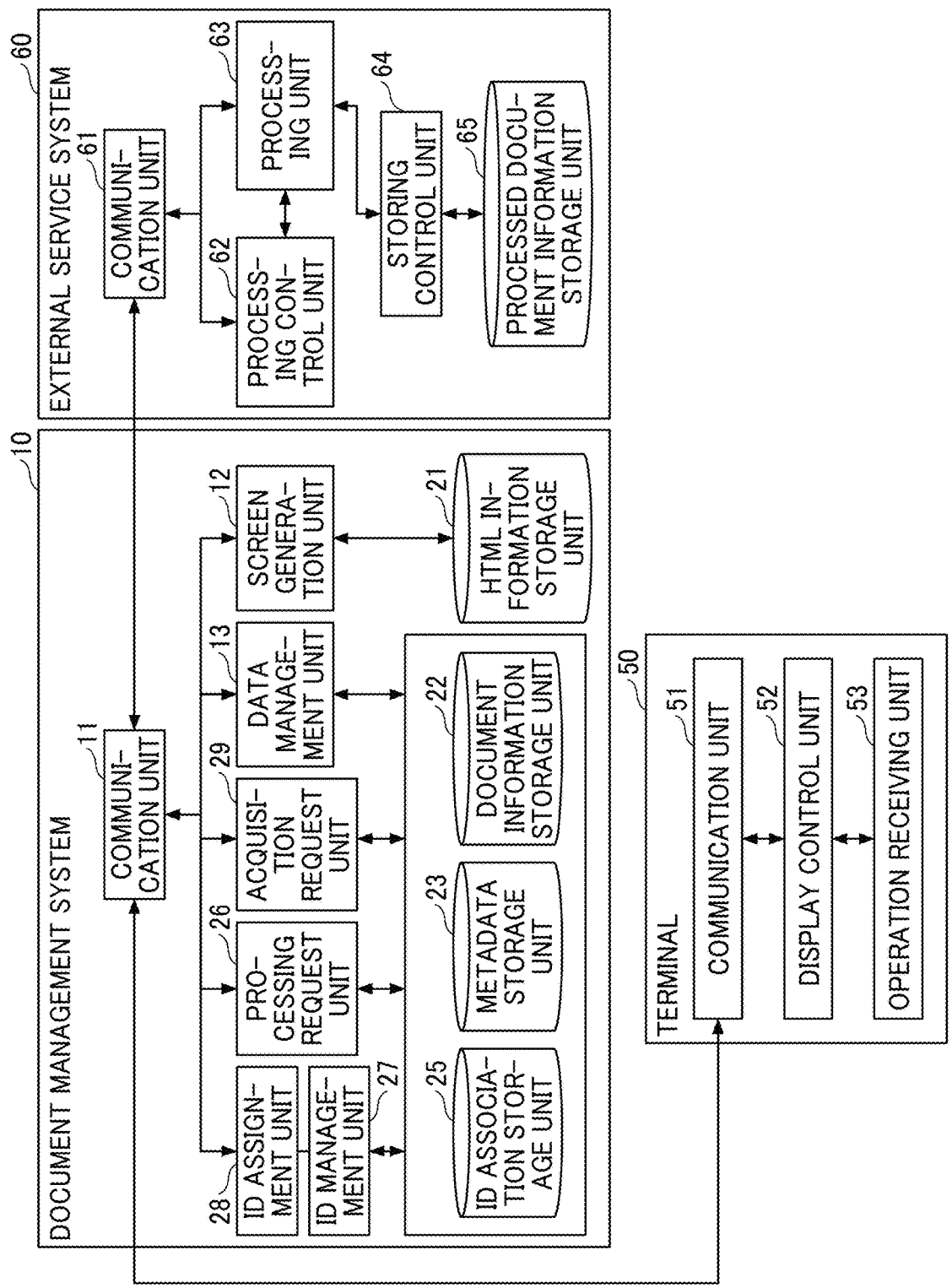
FIG. 28 is a block diagram illustrating functional configurations of the document management system, an external service system, and a terminal according to Embodiment 3.

FIG. 28 is a block diagram illustrating an example of functional configurations of the document management system 10, the external service system 60, and the terminal 50 according to Embodiment 3. In the description referring to FIG. 28, for simplicity, mainly differences from FIG. 4 are described. The function of the terminal 50 may be similar to that in FIG. 4.

Document Management System

In the present embodiment, executing a workflow is not a requisite for the document management system 10, and the document management system 10 does not have functions related to workflow execution. The document management system 10 does not include the workflow control unit 14, the execution unit 15, and the workflow information storage unit 24. However, the document management system 10 according to the present embodiment may execute a workflow.

The data management unit 13 controls document information stored in the document information storage unit 22 and metadata stored in the metadata storage unit 23.

In Embodiment 3, the document management system 10 includes the processing request unit 26, the ID management unit 27, an ID assignment unit 28, and an acquisition request unit 29.

The processing request unit 26 (an example of a first request unit) requests the external service system 60 to process a document transmitted from the terminal 50 and acquires a document ID assigned to the document by the external service system 60 for controlling the document.

The ID assignment unit 28 assigns, to the document received from the terminal 50, a first document ID used by the document management system 10 to control the document and stores the document ID in the document information storage unit 22.

The ID management unit 27 stores, in the ID association storage unit 25, the first document ID assigned to the document by the ID assignment unit 28 and the second document used by the external service system 60 to control the document in association with each other.

Next, the document information storage unit 22, the metadata storage unit 23, and the ID association storage unit 25 will be described.

FIG. 29 illustrates an example of document information stored in the document information storage unit 22 according to the present embodiment. In the following description with reference to FIG. 29, the differences from FIG. 5 are described. As the document ID in FIG. 29 both the first document ID assigned by the document management system 10 and the second document ID assigned by the external service system 60 are registered. For example, the document ID "B" in FIG. 29 is assigned by the external service system 60. The document ID "B" is the second document ID assigned by the external service system 60 before the external service system 60 processes the document. In the present embodiment, the processed document itself may be stored in the item of the file path. Alternatively, a storage location such as a URL or a file path of the processed document may be stored in the item of the file path. The storage location may be transmitted from the external service system 60 (the document itself is not transmitted from the external service system 60) or may be created by the document management system 10.

FIG. 30 illustrates an example of metadata stored in the metadata storage unit 23 according to the present embodiment. In the following description with reference to FIG. 30, the differences from FIG. 6 are described. In FIG. 30, the document ID "B" assigned by the external service system 60 is registered in the item of the document ID. Thus, the user can directly search for the document having the document ID "B." The file name of the document ID "B" is transmitted from the external service system 60. Regarding the document type stored in the metadata storage unit 23 in FIG. 30, a fixed code (for example, "processed") is added to the document type of the document before processing.

Further, in the present embodiment, as illustrated in FIG. 30, the metadata storage unit 23 does not have an item of association information. In the present embodiment, the document management system 10 does not assign the third document ID "C" after processing, and the first document ID "A" and the second document ID "B" are associated with each other in the ID association storage unit 25.

The ID association information stored in the ID association storage unit 25 in Embodiment 3 is similar to that of Embodiment 2 illustrated in FIG. 22. As illustrated in FIG. 22, the ID association storage unit 25 stores the document ID assigned before processing, used by the document management system 10 to control the document, and the document ID used by the external service system 60 to control the document in association with each other. Since the document ID assigned before processing and the document ID used by the external service system 60 are associated with each other, the processed document stored in the document information storage unit 22 is associated with the document ID "A" assigned before processing.

In many cases, the second document ID used by the external service system 60 for controlling the document is assigned before the external service system 60 actually processes the document. However, for convenience, in the present embodiment, the second document ID may be referred to as a "document ID after processing" regardless of the assignment timing. The external service system 60 may assign the second document ID before processing or after processing.

The acquisition request unit 29 (an example of second request unit) transmits, to the external service system 60 via the communication unit 11, a request for transmitting, to the document management system 10, information including the document ID "B" and relating to the document having been processed by the external service system 60.

The communication unit 11 (an example of a reception unit) receives the information on the processed document and the document ID "B" transmitted from the external service system 60.

Based on the received document ID "B," the data management unit 13 stores the information on the processed document received via the communication unit 11 in the document information storage unit 22 in association with the document ID "A."

External Service System

The description with reference to FIG. 28 is continued. Similar to the configuration of Embodiment 2 illustrated in FIG. 21, the external service system 60 includes the communication unit 61, the processing control unit 62, the processing unit 63, the storing control unit 64, and the processed document information storage unit 65. These functions of the external service system 60 are implemented by the CPU 501 of the computer 500 illustrated in FIG. 3 executing a program stored in the HD 504.

The communication unit 61 communicates with the document management system 10 to transmit or receive various information (data). In the present embodiment, the communication unit 61 receives, from the document management system 10, a document to be processed and transmits, to the document management system 10, the second document ID assigned and used by the external service system 60 to control the document. Further, the communication unit 61 transmits the information on the processed document to the document management system 10.

The processing control unit 62 executes processing set in advance in the external service system 60. This processing may be any processing. As described above, examples thereof include OCR processing, PDF conversion processing, image processing, audio processing, file combining processing, and electronic contract processing. When the external service system 60 executes a plurality of processes, the processing control unit 62 may control the order of execution of the plurality of processes. Further, the processing control unit 62 assigns, to the document to be processed, the second document ID used in the external service system 60.

The processing unit 63 is a module that actually performs processing. The processing control unit 62 calls the processing unit 63 to execute various types of processing on a document. The processing unit 63 may be prepared for each of processing such as OCR processing, PDF conversion processing, image processing, audio processing, file combining processing, and electronic contract processing.

The storing control unit 64 stores the document processed by the processing unit 63 in the processed document information storage unit 65 in association with the second document ID assigned by the processing control unit 62. Further, in response to receiving, from the document management system 10, a request for transmitting the processed document specified by the second document ID used in the external service system 60, the storing control unit 64 transmits the information on the document to the document management system 10 via the communication unit 61.

The processed document information stored in the processed document information storage unit 65 in Embodiment 3 is similar to that of Embodiment 2, illustrated in FIG. 23. The processed document information is information on a document having been processed by the external service system 60. Since the processed document information are described above in Embodiment 2, the redundant description is omitted.

Storing of Document ID Assigned by Document Management System and Document ID Assigned by External Service System Next, a procedure for storing document IDs will be described with reference to FIG. 31. FIG. 31 is a sequence diagram illustrating an example of a procedure for the document management system 10 according to Embodiment 3 to store the first document ID used by the document management system 10 and the second document ID used by the external service system 60 in association with each other.

S51: The user operates the terminal 50 to create a document. The document may be a contract document as in Embodiment 1 or may be a simple file generated by an application such as word processing software or presentation software. The document management system 10 max support the creation of the document. In this case, the terminal 50 executes a web application provided by the document management system 10 to guide, for example, user's inputting or selecting of text to create a desired document.

Next, the terminal 50 displays a web page for document registration generated by the screen generation unit 12. The user uploads (transmits) the document to the document management system 10 from the web page. The user inputs, to the terminal 50, an operation of transmitting the document to the document management system 10. The user sets a desired metadata item and inputs a value. The operation receiving unit 53 of the terminal 50 receives the operation, and the communication unit 51 transmits the document and the metadata to the document management system 10. The document management system 10 may extract metadata instead of transmitting metadata from the terminal 50 (or after the metadata is transmitted from the terminal 50).

S52: The communication unit 11 (an example of second communication unit) of the document management system 10 receives the document and the metadata. The screen generation unit 12 requests the data management unit 13 to store the document and the metadata.

S52-2: The data management unit 13 requests the ID assignment unit 28 to store the document and the metadata.

S52-3: The ID assignment unit 28 assigns a document ID "A" to the document and stores the document ID in the document information storage unit 22 in association with the document.

S52-4, S52-5: The ID assignment unit 28 transmits the document ID "A" stored in the document information storage unit 22 to the data management unit 13.

S54: The data management unit 13 sets "A" to the document ID of the metadata. The data management unit 13 stores the metadata in the metadata storage unit 23 in association with the document ID "A."

S55: The data management unit 13 transmits a document processing request to the processing request unit 26. The request of processing may be transmitted prior to or in parallel with the storing the document or the metadata.

S56: The processing request unit 26 transmits the document processing request to the external service system 60 via the communication unit 11. In a case where the external service system 60 can perform a plurality of processes, the processing request unit 26 specifies the content of the processing. The processing request unit 26 does not need to transmit (hut may transmit) the document ID "A" to the external service system 60. When the first document ID is transmitted, the external service system 60 can also store the first document ID assigned by the document management system 10 and the second document ID assigned by the external service system 60 in association with each other.

When the communication unit 61 of the external service system 60 receives the document processing request, the processing control unit 62 assigns, to the document, the document ID "B" used in the external service system 60.

S58: The communication unit 61 of the external service system 60 transmits, to the document management system 10, the document ID "(B)" used by the external service system 60 to control the document. The processing request unit 26 of the document management system 10 receives the document ID "B" via the communication unit 11.

S58-1: The processing request unit 26 transmits as a response the document ID "B" to the data management unit 13.

S59-1: The data management unit 13 stores the document ID "B" in the metadata storage unit 23. At this time, when the external service system 60 transmits a file name in response, the data management unit 13 also stores the file name in the metadata storage unit 23. When the external service system 60 does not transmit the file name at this timing, the data management unit 13 stores the file name in the metadata storage unit 23 at the time when the file name is acquired (for example, when information on the document is acquired). In addition, the data management unit 13 adds a predetermined code (for example, "processed") to the file name of the processed document and stores the code in the item of the document type.

S60-1: The data management unit 13 requests the ID management unit 27 to store the document ID "A" in the ID association storage unit 25.

S60-2: The processing request unit 26 requests the ID management unit 27 to store the document ID "B" in the ID association storage unit 25.

S61: The ID management unit 27 stores the document IDs "A" and "B" in association with each other in the ID association storage unit 25.

With the above procedure, the document IDs "A" and "B" are stored in association with each other in the ID association storage unit 25.

Note that the steps in FIG. 31 need not be performed in the illustrated order. For example, the document IDs "A" and "B" may be stored in the ID association storage unit 25 5 before the document ID "B" is stored in the metadata storage unit 23.

Procedure for Document Management System to Acquire Information on Processed Document from External Service System A description is given of a procedure for the document management system 10 to acquire information on the processed document from the external service system 60, using the document ID "B."

FIG. 32 is a sequence diagram illustrating an example of the procedure for the document management system 10 according to Embodiment 3 to acquire information on the processed document from the external service system 60. The acquisition request unit 29 requests the external service system 60 to transmit the information on the processed document processed by the external service system 60 by specifying the document ID "B" acquired in step S58 of FIG. 31.

S171: The acquisition request unit 29 requests, via the communication unit 11, the external service system 60 to transmit information on the processed document to the document management system 10, by specifying the document ID "B." Since the timing at which the external service system 60 ends the processing of the document is unknown to the acquisition request unit 29, the acquisition request unit 29 repeatedly requests the processed document from the external service system 60.

Instead of repeatedly requesting the processed document from the external service system 60 by the acquisition request unit 29, the external service system 60 may notify the document management system 10 of the completion of the processing by specifying the document ID "B." In response to the completion notification, the acquisition request unit 29 requests the information on the processed document from the external service system 60.

The communication unit 61 of the external service system 60 receives the request for the information on the processed document. The processing control unit 62 determines the order of requests for document processing by the external service system 60 based on the order of receipt of request and the priority. When it is the turn to execute the processing of the document requested by the document management system 10, the processing control unit 62 requests the processing unit 63 to execute the requested processing.

S172: The processing unit 63 processes the document. The storing control unit 64 stores the processed document in the processed document information storage unit 65 in association with the document ID "B."

Note that, when the timing at which the external service system 60 ends the processing of the document is known to some extent, the acquisition request unit 29 may request the processed document at such a timing. For example, in step S58 of FIG. 31, the external service system 60 may notify the document management system 10 of the timing (for example, time in seconds from that time) at which the processing ends.

S173: The communication unit 61 of the external service system 60 transmits the information on the processed document to the document management system 10. The acquisition request unit 29 of the document management system 10 receives the information on the processed document via the communication unit 11. The "information on the processed document" may be the document itself Alternatively, the information on the processed document may be a storage location such as a URL or a file path of the processed document.

S174: The acquisition request unit 29 transmits, to the data management unit 13, the information on the processed document in addition to the document ID "B."

S175: The data management unit 13 stores the information on the processed document in the document information storage unit 22 in association with the document ID "B."

Procedure of Search

Referring to FIG. 33, a description is given of a procedure for searching for a document in response to a user operation. FIG. 33 is an example of a sequence diagram illustrating the procedure for the document management system 10 according to Embodiment 3 to provide the terminal 50 with a search result of a document requested by a user. In the description referring to FIG. 33, for simplicity, mainly differences from FIG. 13 are described. The process from S181 through S189 may be similar to that from S31 to S39 in FIG. 13.

S190: The data management unit 13 acquires, from the ID association storage unit 25, the document ID "B" used in the external service system 60 and associated with the document ID "A" selected by the user.

First, a description is given of a case in which the document management system 10 does not store the document itself (file itself) in the document information storage unit 22.

S191: The data management unit 13 specifies the document ID "B" and requests the acquisition request unit 29 to transmit the document processed by the external service system 60.

S192: In response to the request, the acquisition request unit 29 requests, via the communication unit 11, the processed document associated with the document ID "B" from the external service system 60.

S193: The communication unit 61 of the external service system 60 receives the request. The storing control unit 64 acquires the document associated with the document 1D "B" from the processed document information storage unit 65. The communication unit 61 transmits the document associated with the document ID "B" to the document management system 10.

S194: The acquisition request unit 29 of the document management system 10 receives the document associated with the document ID "B" via the communication unit 11. The acquisition request unit 29 transmits the document associated with the document ID "B" to the data management unit 13.

Alternatively, when the storage location such as the URL or the file path of the processed document is stored in the document information storage unit 22, the data management unit 13 may acquire the processed document from the storage location.

In steps S191 to S194, the document management system 10 acquires the document itself from the external service system 60. Alternatively, the document management system 10 may acquire the information on the document associated with the document ID "B" from the document information storage unit 22 and transmit a document display screen in which a URL or the like is embedded to the terminal 50. The terminal 50 can access the URL and acquire the document associated with the document ID "B."

Next, a description is given of a case in which the document management system 10 stores a document itself (file itself) in the document information storage unit 22.

S195, 196: The data management unit 13 acquires the document associated with the document ID "B" from the document information storage unit 22.

S197: The data management unit 13 passes the document associated with the document ID "B" to the screen generation unit 12.

S198: The screen generation unit 12 generates screen information of a document display screen (an example of second screen information) on which the file names of the documents having the document IDs "A" and "B" are displayed and the documents are attached. Note that the document associated with the document ID "B" is not necessarily attached to the document display screen. The screen generation unit 12 may display the file names of the documents associated with the document IDs "A" and "B" and generate screen information of a document display screen in which the storage location of the document ID "B" is embedded.

The communication unit 11 of the document management system 10 transmits the screen information (an example second information of second screen) of the document display screen to the terminal 50. The communication unit 51 of the terminal 50 receives the screen information of the document display screen. The display control unit 52 displays the document display screen according to the screen information generated by the screen generation unit 12. An example of the document display screen is the same as that illustrated in FIG. 26 and described in Embodiment 2.

The screens for document registration, metadata setting, search, and document list may be respectively the same as the document registration screen 250 in FIG. 14A, the metadata setting screen 260 in FIG. 14B, the search screen 210 in FIG. 15, and the document list screen 220 in FIG. 16 according to Embodiment 1.

In FIG. 26, the file name "document_A_B" of the document controlled by the external service system 60 is presented in the second document field 234. This document is associated with the document ID of the document presented in the first document field 233 in the ID association storage unit 25. In this way, the user can know the file name of the document controlled by the external service system 60 by selecting the document registered in the document management system 10.

Since the processed document controlled by the external service system 60 is attached to the document display screen 230, the user can browse the processed document, Even when the processed document is not attached to the document display screen 230, since at least the storage location such as the URL or the file path is embedded in the document display screen 230, the user can access and view the processed document.

The document management system 10 according to Embodiment 3 stores the first document ID "A" used for document control in the document management system 10 and the second document ID "B" used for document control in the external service system 60 in association with each other. The document management system 10 stores the information on the processed document in association with the document ID "A" assigned to the document before processing. This configuration enables the user to acquire, by using the document management system 10, the document processed by the external service system 60 from the document management system 10.

Now, descriptions are given of other application of the embodiments described above.

Although embodiments of the present disclosure are described above, the present disclosure is not limited to the details of the embodiments described above, and various modifications and replacements are possible within a scope not departing from the aspects of the present disclosure.

For example, in the above-described embodiments, in the process of executing the workflow, the document management system 10 cooperates with the electronic contract system 30 and the document IDs are associated with each other. Alternatively, the document management system 10 may not execute the workflow. For example, the user may instruct a process to be executed by the document management system 10 and a process to be executed by the electronic contract system 30 in order.

Even when one document is transmitted from the document management system 10, a plurality of documents may be generated as a result of a process performed by the electronic contract system 30. In this case, identification information is assigned to each document generated by the electronic contract system 30.

There are various workflows. For example, one workflow includes performing optical character recognition (OCR) of a document and saving the document in a cloud storage. Another workflow includes receiving an e-mail or a facsimile and saving the e-mail or the facsimile in a cloud storage. A workflow is generated by the user setting each process performed therein.

In the above-described embodiments, the electronic contract system 30, the time stamp system, the noise removal system, and the digital watermark system are examples of the external service system, but the examples include various systems such as a cloud storage system, an OCR system, translation system, and a voice recognition system.

The configuration examples illustrated in, for example, FIGS. 4, 21, and 28 functional units are divided according to the main functions for ease of understanding of the processing by the document management system 10, the electronic contract system 30, and the terminal 50. Each processing unit or each specific name of the processing unit is not to limit the scope of the present disclosure. The processes implemented by the document management system 10, the electronic contract system 30, and the terminal 50 may be divided into a larger number of processes according to the contents of processes. In addition, a single processing unit can be further divided into a plurality of processing units.

The apparatuses or devices described in one embodiment are just one example of plural computing environments that implement the one embodiment in this specification. In one embodiment, the document management system 10 includes a plurality of computing devices such as server clusters. The plurality of computing devices communicates with one another through any type of communication link including, for example, a network or a shared memory, and performs the operations described in the present disclosure.

Further, the document management system 10 may be configured to share the steps in the present embodiment illustrated in, for example, FIGS. 9, 13, 24, 25, and 31 to 33, in various combinations. The document management system 10 may be integrated into one server or may be divided into a plurality of devices or apparatuses.

An aspect of the present disclosure concerns an information processing system including a terminal to transmit electronic data and an information processing apparatus to request an external service system to perform predetermined processing on the electronic data.

The terminal includes a first communication unit to transmit the electronic data to the information processing apparatus.

The information processing apparatus includes: a second communication unit to receive, from the terminal, first electronic data and a request for processing on the first electronic data.; an identification information assignment unit to assign first identification information to the first electronic data first request unit to request the external service system to perform the processing on the first electronic data received by the second communication unit, and acquire, from the external service system, second identification information used by the external service system to control the first electronic data; an identification information management unit to store, in a storage area, the first identification information and the second identification information in association with each other; a second request unit to request the external service system to transmit, to the information processing apparatus, information on second electronic data having been generated by the processing on the first electronic data performed by the external service system, the information including the second identification information; a reception unit to receive the second electronic data and the second identification information transmitted from the external service system based on the request made by the second request unit; and a data management unit configured to store the information on the second electronic data received by the reception unit in association with the first identification information used by the information processing apparatus to control the first electronic data.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. The term "processing circuit or circuitry" in the present specification includes a programmed processor to execute the functions by software, such as a processor implemented by an electronic circuit, and devices, such as an application specific integrated circuit (ASIC), a digital signal processors (DSP), a field programmable gate array (FPGA), and conventional circuit modules arranged to perform the above-described functions.

The functionality of the elements disclosed herein may be implemented using circuitry or processing circuitry which includes general purpose processors, special purpose processors, integrated circuits, application specific integrated circuits, digital signal processors, field programmable gate arrays, conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising circuitry configured to:
   receive, from a terminal, first electronic data and a request for processing the first electronic data;
   assign, to the first electronic data, first identification information used to control the first electronic data;
   transmit a first request for performing predetermined processing on the first electronic data via a network to an external service system that performs the predetermined processing;
   acquire, via the network from the external service system, second identification information assigned by the external service system to control the first electronic data;
   store, in a memory, the second identification information in association with the first identification information;
   transmit a second request to acquire a second electronic data which is generated by the predetermined processing performed on the first electronic data, based on the second identification information;
   acquire, via the network from the external service system, the second electronic data and cause the information processing apparatus to display a screen including a preview field and display information on the first identification information and information on the second identification information;
   display the first electronic data in the preview field in response to selecting the information on the first identification information; and
   display the second electronic data in the preview field in response to selecting the information on the second identification information.

2. The information processing apparatus according to claim 1,
   wherein the circuitry:
      generates first screen information for displaying a first screen to receive a user operation, the first screen including at least information on the first electronic data controlled by the information processing apparatus; and
      transmits the first screen information to the terminal.

3. The information processing apparatus according to claim 2,
   wherein the terminal receives selection of the first electronic data by the user operation on the first screen, and
   wherein the circuitry:
      specifies the second identification information associated with the first identification information identifying the selected first electronic data;
      acquires, from the external service system, information on the second electronic data associated with the second identification information, the second electronic data having been generated by the predetermined processing on the first electronic data performed by the external service system;
      generates second screen information including the information on the second electronic data; and
      transmits the second screen information to the terminal.

4. The information processing apparatus according to claim 3,
   wherein the information on the second electronic data includes the second identification information or information indicating a storage location of the second electronic data.

5. The information processing apparatus according to claim 1,
   wherein the second identification information is assigned by the external service system.

6. The information processing apparatus according to claim 1,
   wherein the circuitry:
      transmits, to the external service system, the second request which includes a request for transmitting, to the information processing apparatus, information on the second electronic data having been generated by the processing on the first electronic data performed by the external service system, the information on the second electronic data including the second identification information;
      receives the second electronic data and the information on the second electronic data transmitted from the external service system based on the request for transmitting; and
      stores, in the memory, the information on the second electronic data in association with the first identification information used by the information processing apparatus to control the first electronic data.

7. The information processing apparatus according to claim 6,
   wherein the circuitry transmits the second request at regular intervals.

8. The information processing apparatus according to claim 6,
   wherein the circuitry transmits the second request in response to a notification of completion of the processing, received from the external service system.

9. The information processing apparatus according to claim 1, wherein the circuitry is configured to:
store, in the memory, the second electronic data in association with the first electronic data identified by the first identification information, the first identification information corresponding to the second identification information included in the second request.

10. A data management method performed by an information processing apparatus, the method comprising:
receiving, from a terminal, first electronic data and a request for processing the first electronic data;
assigning, to the first electronic data, first identification information used to control the first electronic data;
transmitting a first request for performing predetermined processing on the first electronic data via a network to an external service system that performs the predetermined processing;
acquiring, via the network from the external service system, second identification information assigned by the external service system to control the first electronic data;
storing, in a memory, the second identification information in association with the first identification information;
transmitting a second request to acquire a second electronic data which is generated by the predetermined processing performed on the first electronic data, based on the second identification information;
acquiring, via the network from the external service system, the second electronic data and causing the information processing apparatus to display a screen including a preview field and display information on the first identification information and information on the second identification information;
displaying the first electronic data in the preview field in response to selecting the information on the first identification information; and
displaying the second electronic data in the preview field in response to selecting the information on the second identification information.

11. The data management method according to claim 10, wherein the first electronic data is an electronic contract document.

12. The data management method according to claim 10, further comprising:
storing, in the memory, the second electronic data in association with the first electronic data identified by the first identification information, the first identification information corresponding to the second identification information included in the second request.

13. A non-transitory recording medium storing a plurality of program codes which, when executed by one or more processors, causes the processors to perform a method, the method comprising:
receiving, from a terminal, first electronic data and a request for processing the first electronic data;
assigning, to the first electronic data, first identification information used to control the first electronic data;
transmitting a first request for performing predetermined processing on the first electronic data via a network to an external service system that performs the predetermined processing;
acquiring, via the network from the external service system, second identification information assigned by the external service system to control the first electronic data;
storing, in a memory, the second identification information in association with the first identification information;
transmitting a second request to acquire a second electronic data which is generated by the predetermined processing performed on the first electronic data, based on the second identification information;
acquiring, via the network from the external service system, the second electronic data and causing an information processing apparatus to display a screen including a preview field and display information on the first identification information and information on the second identification information;
displaying the first electronic data in the preview field in response to selecting the information on the first identification information; and
displaying the second electronic data in the preview field in response to selecting the information on the second identification information.

14. The information processing apparatus according to claim 1, wherein the first electronic data is an electronic contract document.

15. The non-transitory recording medium according to claim 13, wherein the first electronic data is an electronic contract document.

16. The non-transitory recording medium according to claim 13, further comprising:
storing, in the memory, the second electronic data in association with the first electronic data identified by the first identification information, the first identification information corresponding to the second identification information included in the second request.

* * * * *